(12) United States Patent
Bakker et al.

(10) Patent No.: US 7,226,563 B2
(45) Date of Patent: *Jun. 5, 2007

(54) ION-DETECTING SENSORS COMPRISING PLASTICIZER-FREE COPOLYMERS

(75) Inventors: Eric Bakker, Auburn, AL (US); Yu Qin, Auburn, AL (US)

(73) Assignee: Auburn University, Auburn, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 10/856,665

(22) Filed: May 28, 2004

(65) Prior Publication Data

US 2005/0011760 A1    Jan. 20, 2005

Related U.S. Application Data

(63) Continuation-in-part of application No. 10/384,097, filed on Mar. 7, 2003, which is a continuation-in-part of application No. 10/313,090, filed on Dec. 5, 2002.

(60) Provisional application No. 60/473,677, filed on May 28, 2003.

(51) Int. Cl.
    G01N 27/333   (2006.01)
    G01N 21/01    (2006.01)
    G01N 33/20    (2006.01)

(52) U.S. Cl. .............. 422/82.03; 204/416; 204/418; 205/781.5; 422/56; 422/82.01; 422/82.02; 422/82.05; 422/82.06; 422/82.07; 422/82.08; 422/82.09; 422/82.11; 436/73; 436/74; 436/79; 436/80; 436/81; 436/82; 436/83; 436/84; 436/149; 436/150; 436/151; 436/169; 436/172

(58) Field of Classification Search ............ 422/56, 422/82.01–82.03, 82.05–82.09, 82.11; 436/73–74, 436/79–84, 149–151, 169, 172; 204/416, 204/418; 205/781.5; 560/4, 130, 205; 568/4
See application file for complete search history.

(56) References Cited

U.S. PATENT DOCUMENTS

| | | | | |
|---|---|---|---|---|
| 3,716,506 A | * | 2/1973 | Simms et al. ............... 525/77 |
| 3,755,234 A | * | 8/1973 | Chujo et al. ............... 524/459 |
| 4,162,282 A | | 7/1979 | Fulwyler et al. |
| 4,174,531 A | * | 11/1979 | McCarthy et al. .......... 361/779 |
| 4,221,683 A | * | 9/1980 | Nakate et al. ............... 524/32 |
| 4,302,166 A | | 11/1981 | Fulwyler et al. |
| 4,463,032 A | * | 7/1984 | Arndt et al. ................ 427/222 |
| 4,828,359 A | * | 5/1989 | Ueba et al. ................. 385/123 |
| 5,198,301 A | * | 3/1993 | Hager et al. ............ 428/355 AK |
| 5,238,548 A | * | 8/1993 | van der Wal et al. ....... 204/418 |
| 5,260,195 A | * | 11/1993 | Azhar et al. ................ 435/25 |
| 5,644,069 A | * | 7/1997 | Liu et al. .................... 73/23.2 |
| 5,731,470 A | | 3/1998 | Michl et al. |
| 5,747,349 A | * | 5/1998 | van den Engh et al. .... 436/172 |
| 6,143,558 A | | 11/2000 | Kopelman et al. |
| 6,143,570 A | * | 11/2000 | Alder et al. ................ 436/74 |
| 6,277,330 B1 | * | 8/2001 | Liu et al. ................... 422/82.05 |
| 6,548,310 B1 | * | 4/2003 | Murata et al. .............. 436/518 |

FOREIGN PATENT DOCUMENTS

| | | |
|---|---|---|
| EP | 0 432 990 A2 | 6/1991 |
| EP | 0 490 631 A2 | 6/1992 |
| JP | 57158202 | 9/1982 |
| WO | 97/39337 | * 10/1997 |

OTHER PUBLICATIONS

Pretsch, E. et al, Helvetica Chimica Acta 1980, 63, 191-196.*
Harker, R. Chemistry in New Zealand 1990, 54, 59-60.*
Daunert, S. et al, Analytical Chemistry 1990, 62, 1428-1431.*
Bochenska, M. et al, Journal of Inclusion Phenomena and Molecular Recognition in Chemistry 1991, 10, 19-27.*
Xu, W. et al, Chinese Chemical Letters 1993, 4, 179-180.*
Xie, Z. et al, Journal of the American Chemical Society 1994, 116, 1907-1913.*
Cross, G. G. et al, Talanta 1994, 41, 1589-1596.*
King, B. T. et al, Journal of the American Chemical Society 1996, 118, 3313-3314.*
Xie, Z. et al, Inorganic Chemistry 1998, 37, 6444-6451.*
Smirnova, A. L. et al, Electroanalysis 1999, 11, 763-769.*
Heng, L. Y. et al, Analytical Chemistry 2000, 72, 42-51.*
Heng, L.Y. et al, Analytica Chimica Acta 2000, 403, 77-89.*
Heng, L. Y. et al, Electroanalysis 2000, 12, 178-186.*
Heng, L. Y. et al, Electroanalysis 2000, 12, 187-193.*
Malinowska, E. et al, Analytica Chimica Acta 2000, 421, 93-101.*
Tsang, C.-W. et al, Inorganic Chemistry 2000, 39, 3582-3589.*
Telting-Diaz, M. et al, Analytical Chemistry 2001, 73, 5582-5589.*
Peper, S. et al, Analytical Chemistry 2002, 74, 1327-1332.*
Qin, Y. et al, Analytical Chemistry 2003, 75, 3038-3045.*
Qin, Y. et al, Analytical Chemistry 2003, 75, 6002-6010.*

(Continued)

*Primary Examiner*—Arlen Soderquist
(74) *Attorney, Agent, or Firm*—Hogan & Hartson LLP

(57) ABSTRACT

Plasticizer-free ion-detecting sensors for detecting a target ion in a sample are provided. The sensor comprises a plasticizer-free copolymer comprised of polymerized units of methacrylate monomers and a polymerizable ion exchanger, wherein the methacrylated monomers have pendent alkyl groups of different length and wherein the functionalized ion-exchanger is grafted into the copolymer through covalent linkages. The ion exchanger comprises a C-derivative of a halogenated closo-dodecacarborane anion having a polymerizable moiety. Sensors of this invention include carrier-based ion-selective electrodes or optodes such as thin film ion-specific optodes, particle-based optodes, or bulk optodes.

48 Claims, 6 Drawing Sheets

OTHER PUBLICATIONS

Stahl, G. A., Journal of Polymer Science, Polymer Chemistry Edition 1979, 17, 1883-1886.*
Johnson, J.A. et al, Journal of Materials Science 1994, 29, 870-876.*
Penzel, E. et al, Polymer 1997, 38, 325-337.*
Van der Voort Maarschalk, K. et al, Drug Development and Industrial Pharmacy 1998, 24, 261-268.*
"Production of Uniform Microspheres," The Review of Scientific Instruments (vol. 44—No. 2), Feb. 1973.
Bakker et al., "Plasticiser-Free Polymer Membrane Electrodes Containing a Methacrylic Copolymer Matrix" ELECTROANALYSIS, vol. 14, No. 19-20, 2002, pp. 1375-1381.
Rosatzin et al., "Preparation of Ca2+ Selective Sorbents by Molecular Imprinting Using Polymerisable Ionophores" Journal of Chemical Society, Perkin Transactions 2, No. 8, 1991, pp. 1261-1265.
Rosatzin et al., "Immobilization of Components in Polymer Membrane-Based Calcium-Selective Bulk Optodes," Analytical Checmistry, vol. 64, No. 18, 1992, pp. 2029-2035.
Schefer et al., "Neutral Carrier Based Ca2+ -Selective Electrode with Detection Limit in the Sub-Nanomolar Range," Analytical Chemistry, vol. 58, No. 11, Sep. 1986, pp. 2282-2285.
Gehrig, P. et al., *Very Lipophilic Calcium(2+)-Selective Ionophore for Chemical Sensors of High Lifetime* Chimia Dec. 1989, vol. 43, No. 12, pp. 377-379.

* cited by examiner

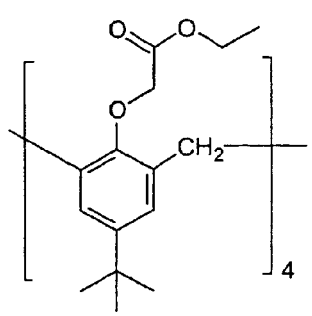
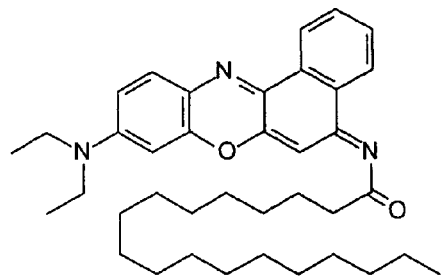
Na-ionophore (X)　　　　　　ETH 5294
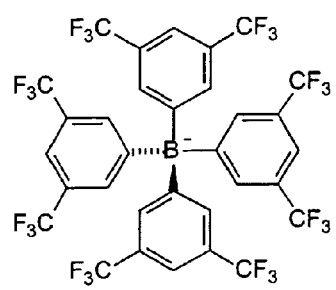
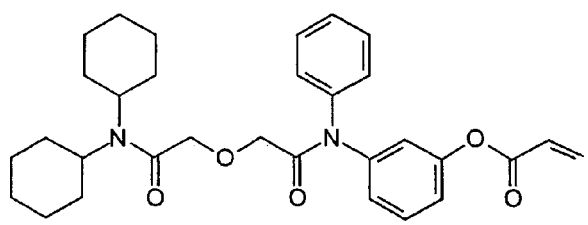
TFPB⁻　　　　　　AU-1
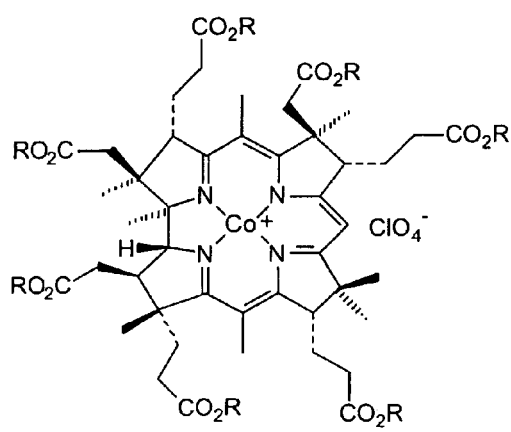
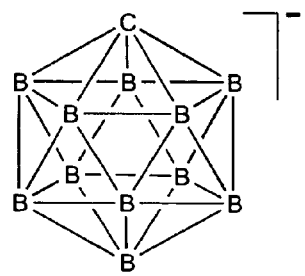
R: -CH$_2$-CH$_2$-C$_6$H$_5$
NO$_2^-$ (I)　　　　　　Pseudo-icosahedral parent carborane CB$_{11}$H$_{12}^-$
Fig. 1

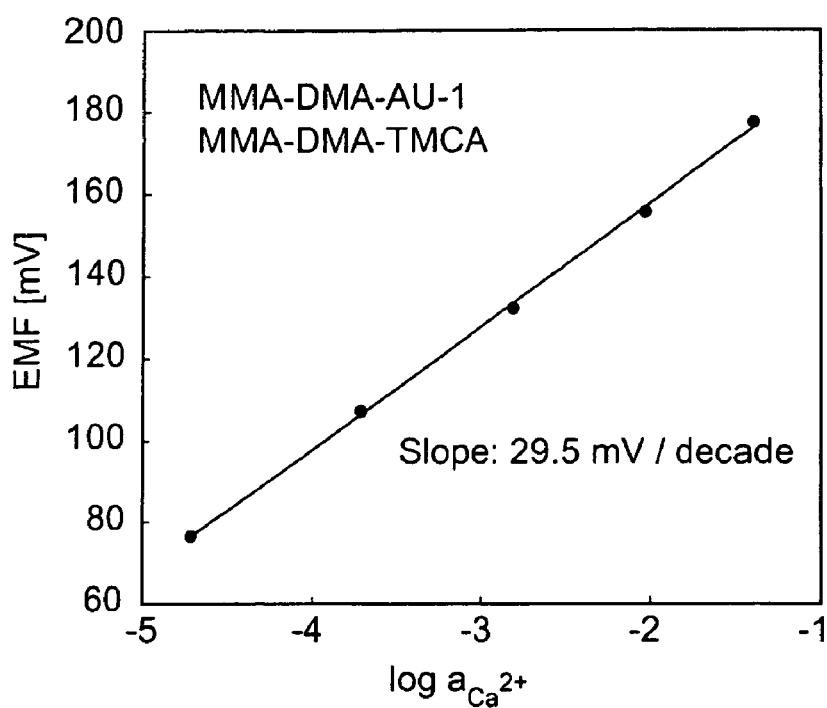
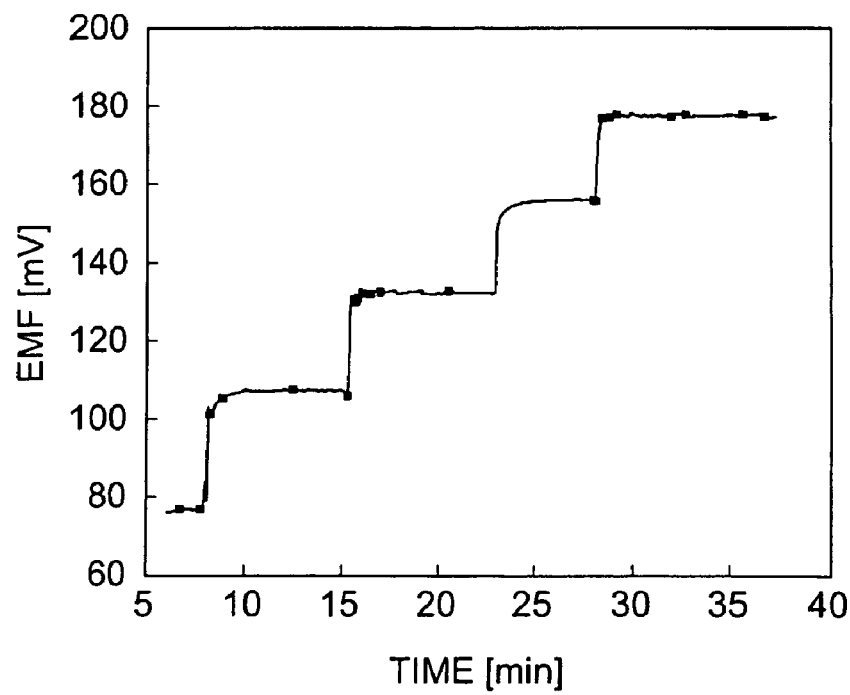
Fig. 6

ION-DETECTING SENSORS COMPRISING PLASTICIZER-FREE COPOLYMERS

CROSS-REFERENCE TO RELATED APPLICATIONS

The present invention is a Continuation-in-Part of U.S. application Ser. No. 10/384,097, filed Mar. 7, 2003, which is a Continuation-in-Part of U.S. application Ser. No. 10/313,090, filed Dec. 5, 2002, each of which is incorporated herein by reference in its entirety. The present invention also claims priority to Provisional Application No. 60/473,677, filed on May 28, 2003, entitled "A Co-Polymerized Dodecacarborane Anion as Covalently Attached Cation-Exchanger in Ion-Selective Sensors," which is incorporated herein by reference in its entirety.

BACKGROUND OF THE INVENTION

1. Field of the Invention

The present invention is related to systems for detecting target ions in a sample, and more specifically, to ion sensors comprising an ion exchanger covalently grafted to a plasticizer-free co-polymer.

2. Description of the Prior Art

Throughout this application, various references are referred to within parentheses. Disclosures of these publications in their entireties are hereby incorporated by reference into this application to more fully describe the state of the art to which this invention pertains. Full bibliographic citation for these references may be found at the end of this application, preceding the claims.

Highly selective chemical sensors based on molecular recognition and extraction principles are a very important, well understood class of sensors.[1,2] Ion-selective electrodes (ISEs) and optodes in particular have found widespread use in clinical laboratories[3] and are being explored for numerous other applications.

Traditionally, these sensors are based on hydrophobic plasticized polymeric membranes or films that are doped with one or more ionophores in addition to a lipophilic ion-exchanger. Each of these components plays an important role to the sensor response.[2,4] The hydrophobicity of the polymer assures that spontaneous, non-specific electrolyte extraction from the sample is suppressed. At the same time, the membrane matrix must act as a solvent of low viscosity for all active sensing components in the film. Each ionophore acts as a lipophilic complexing agent, and the ion-exchanger is responsible to extract the analyte ions from the sample to the membrane to satisfy electroneutrality.

In many ways, the basic composition and function of these ISEs still mimics that of early liquid membrane electrodes, where all components were simply dissolved in an organic solvent. However, modern ion sensors are moving towards drastic miniaturization and these sensors are often in contact with relatively lipophilic sample environments such as undiluted whole blood. Microelectrodes have been used for a long time to probe intracellular ion compositions and are also used for chemical profiling and chemical microscopy.[5] Microsphere optodes with varying compositions are today developed in view of the measurement of biological and clinical samples.[6] Optical sensing spheres that are a few hundred nanometers in diameter are currently explored for intracellular ion measurements.[7] These important applications expect that cross-contamination of sensors and leaching of active components from the sensor membrane are reduced or even eliminated.

Earlier work has focused on improving the lipophilicity of all sensing components for improved lifetime of these sensors. There is likely a practical limit to synthesizing ionophores and plasticizers with longer alkyl chains to make them more lipophilic,[8] since they still must remain soluble in the polymeric membrane phase. One solution to the problem of insufficient retention has been the covalent attachment of all active sensing components onto the polymeric backbone. Over the years, plasticizer-free ion-selective membranes based on different materials have been evaluated. Suitable matrices include polyurethanes,[9] polysiloxanes,[10,11] silicone rubber,[12,13] polythiophenes,[14] polyacrylates,[15] epoxyacrylates,[16] sol-gels,[17,18] methacrylic-acrylic copolymers[19-22] and methacrylate copolymers.[23,24] Among these, the methacrylic-acrylic copolymers and methacrylate copolymers, which are synthesized via free radical-initiated mechanisms, are attractive because various monomer combinations and the numerous polymerization methods are available to create polymers with different physical and mechanical properties. Of the plasticizer-free copolymers reported, a methyl methacrylate and decyl methacrylate copolymer (MMA-DMA) has been studied by Peper et al. (U.S. Patent Publication No. 2003/0217920) as a promising matrix, with functional ISEs[23] and optodes[25] reported for $Li^+$, $Na^+$, $K^+$, $Ca^{2+}$, and $Mg^{2+}$.

Early work towards covalent attachment of ionophores made use of functionalized poly(vinyl chloride)[26,27], which could not be used without plasticizer. In later work, $Na^+$, $K^+$ and $Pb^{2+}$ selective ionophores were covalently grafted to a polysiloxane matrix and applied to the fabrication of CHEMFET sensors.[10,28] Another notable direction in ionophore grafting by the sol-gel technique has been introduced by Kimura, with demonstrated applications to serum measurements.[17,18]. Recently, neutral ionophores were covalently attached by Pretsch and coworkers to a polyurethane membrane matrix in view of reducing ion fluxes across the membrane.[29] In other recent reports, two hydrophilic crown ether-type potassium-selective ionophores, 4'-acryloylamidobenzo-15-crown-5 (AAB15C5) and 4'-acryloylamidobenzo-18-crown-6 (AAB18C6),[20] a sodium-selective ionophore, 4-tertbutyl calix[4]arene tetraacetic acid tetraethyl ester,[21] as well as a new calcium ionophore N,N-dicyclohexyl-N'-phenyl-N'-3-(2-propenoyl) oxyphenyl-3-oxapentanediamide (AU-1; see FIG. 1)[24] have been copolymerized with other acrylate monomers by a simple one-step solution polymerization method. The simplicity of this procedure constitutes an important advantage over most other methods described above. These polymers containing grafted ionophores showed comparable selectivity and improved lifetime compared to ISEs with free, unbound ionophore present. Numerous promising approaches are therefore available to obtain plasticizer-free polymers containing covalently attached ionophores.

Unlike the grafting of ionophores, the covalent attachment of ion-exchangers has been much less explored. Reinhoudt reported on the covalent attachment of the tetraphenylborate anion, $TPB^{-[10,28]}$ and Kimura also successfully attached a cation-exchanger $(TPB_-)^{17}$ as well as an anion-exchanger (tetradecyldimethyl(3-trimethoxysilylpropyl)ammonium chloride) into a sol-gel matrix.[18] Unfortunately, it is known that the unsubstituted tetraphenylborate is highly susceptible to decomposition by acid hydrolysis, oxidants and light.[30-32] It was also reported that ppb levels of mercury ions in aqueous solution can cause rapid decomposition of sodium tetraphenylborate and potassium tetrakis-(4-chlorophenyl) borate in plasticized PVC membranes.[33] Therefore, the reported covalent attachments of a simple tetraphenylborate may likely not solve these inherent problems.

Although the highly substituted derivatives, such as sodium tetrakis[3,5-bis(trifluoromethyl)phenyl]borate (NaTFPB) have a much improved stability, the borates can still be protonated under acidic conditions and subsequently hydrolyze.[32] A decrease in selectivity and response slopes of ion-selective membranes after prolonged exposure to a continuous water flow was observed, which was explained on the basis of the change of ionophore and ion exchanger (NaTFPB) ratio caused by slow degradation of the borate anions.[10] In addition, the preparation of highly substituted borate anions, especially asymmetric analogs, is quite difficult and synthetically complex.[34,35] A further modification of these compounds, such as the preparation of polymerizable derivatives has never been reported.

It was recently shown that carboranes can be used as alternative cation-exchangers in ion selective sensors.[36-38] Carboranes are a relatively new class of weakly coordination anions based on an extremely stable boron cluster framework ($CB_{11}H_{12}^-$), as shown in FIG. 1. Carboranes are weakly coordinating anions that are based on a relatively stable boron cluster framework. They also have versatile functionalization chemistry, as both the boron-vertexes and carbon vertex can be chemically modified.[39,40] The B—H bonds of the parent closo-dodecacarborane ($CB_{11}H_{12}^-$) are somewhat hydridic and suitable for electrophilic substitution such as halogenation.

Chlorinated, brominated and iodinated carborane anions at boron atoms have been prepared by solid-state synthesis.[36, 37] Recently, halogenated dodecacarboranes were found to be improved cation-exchanger in terms of lipophilicity and chemical stability. These boron derivatives have a much higher lipophilicity compared to the water-soluble unsubstituted parent carborane anion, and were demonstrated to be very promising alternatives to the tetraphenylborates.[36] In contrast, the C—H bond in the carborane anion is somewhat acidic. It was reported that C-lithiation of $CB_{11}H_{12}^-$ followed by treatment with alkyl, silyl, or phosphine halides leads to different carbon derivatives.[40] Such carborane anions are quite inert chemically and electrochemically and exhibit no absorbance in the UV-Vis range. These compounds have weak coordination and ion-pair formation properties, which are attractive for ion sensing applications. Furthermore, both the boron-vertexes and carbon vertex can be quite easily modified chemically.[39,40] However, the commercially available cesium carborane ($CsCB_{11}H_{12}$) is water-soluble and its poor lipophilicity limits its application as ion-exchanger. In our laboratory, therefore, a number of more lipophilic B-halogenated carborane anions were recently synthesized, and many showed nearly identical ion-exchange and improved retention properties compared to the best tetraphenylborate available, tetrakis[3,5-(trifluoromethyl)]phenyl borate (TFPB$^-$).[36,37]

In addition to potentially unparalleled lipophilicity, the carboranes possess many other characteristics that make them suitable for electrochemical applications. For example, they are not susceptible to acid and base hydrolysis and they are relatively inert to electrochemical oxidation (.about. 2.0 V vs. ferrocene/ferrocenium at Pt in dichloromethane) (67). High $I_h$ symmetry and tangentially delocalized σ-bonding make the carboranes one of the most chemically stable classes of compounds in chemistry. Furthermore, their bulky size (nearly 1 nm in diameter) and sufficient charge delocalization meet the criteria imposed for sufficient ion-exchanging. Another advantage, important for bulk optode studies, is their lack of absorption in the UV-Vis spectrum. Therefore, it is desirable to further study the carboranes for developing a more robust ion-exchanger to be used in chemical sensors.

SUMMARY OF THE INVENTION

The present invention provides a new polymerizable carborane derivative that is covalently attached onto a hydrophobic polymer matrix for use in ion-selective electrodes and optodes. More specifically, one aspect of this invention is based on the discovery that copolymers of methacrylate monomers and a novel polymerizable dodecacarborane anion derivative are suitable matrices for preparing polymers comprising grafted ion exchangers, referred to as "graft polymers." The graft polymers of this invention can be used to prepare sensors such as ISE's and optodes for detecting target ions in a sample.

In one embodiment, an ion-detecting sensor for detecting a target ion in a sample comprises (i) a copolymer matrix comprising polymerized units of methacrylate monomers and an ion exchanger comprising a functionalized C-derivative of a closo-dodecacarborane anion, wherein said functionalized ion exchanger is grafted onto the copolymer through covalent linkages; and (ii) an ionophore for detecting the target ion, wherein said methacrylate monomers have $R_1$ or $R_2$ pendant alkyl groups wherein $R_1$ is any of $C_{1-3}$ alkyl groups and $R_2$ is any of $C_{4-12}$ alkyl groups.

Preferably the methacrylate monomers comprise different pendant alkyl groups $R_1$ and $R_2$, wherein $R_1$ may be any of $C_{1-3}$ alkyl group, and $R_2$ may be any of $C_{4-12}$ alkyl group. In one embodiment, the plasticizer-free co-polymer is blended with poly(vinyl chloride) and a plasticizer. Alternatively, the polymer includes monomer units in addition to methacrylate monomers, such as acrylate monomers.

The present invention further provides a novel C-derivative of the closo-dodecacarborane anion ($CB_{11}H_{12}^-$) having a polymerizable group suitable for use as a chemically stable cation-exchanger. Accordingly, this invention further provides a novel polymerizable derivative of a dodecacarborane, said derivative having the structure (I):

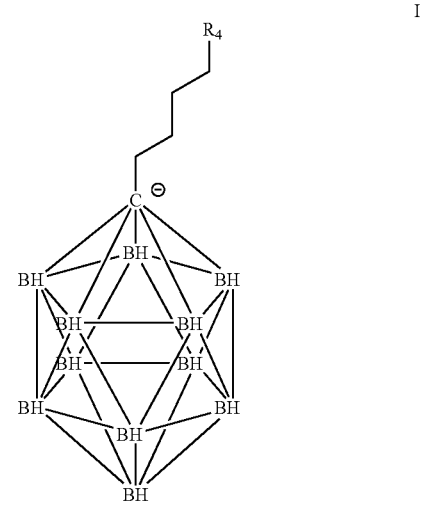

wherein $R_4$ is a substituent comprising a double bond. In one embodiment, $R_4$ is —O(C=O)CH=CH$_2$. This novel derivative can be co-polymerized with methacrylate monomers to prepare a plasticizer-free polymer with cation-exchange properties. The resulting co-polymer comprising the covalently grafter dodecacarborane derivative can be conveniently blended with traditional plasticized poly(vinyl chloride) or with non-crosslinked methacrylic polymers to provide solvent cast films that are clear and homogenous and that can be doped with ionophores.

In one embodiment, the ionophore is a functionalized ionophore. According to one embodiment, at least a portion of the functionalized ionophore is grafted to the co-polymer by covalent bonds. Examples of functionalized ionophores include derivatives of 3-oxapentandiaminde-type calcium ionophore comprising a polymerizable moiety, and hydrophilic crown ether-type ionophores. In another embodiment, the functionalized ionophore is a 3-oxapentandiaminde derivative having the structure II

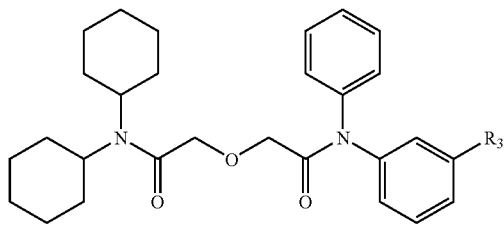

wherein $R_3$ is a polymerizable moiety such as an acrylic group.

The co-polymer matrices of the present invention may be in a form of membranes or particles.

The ion-detecting sensors of the present invention may also include an indicator ionophore.

In another embodiment, the present invention also provides the first plasticizer-free ion selective membrane selective for divalent ions, wherein both the ionophore and the ion-exchanger are covalently attached to the polymer, thereby forming an all polymeric sensing matrix with no leachable components.

This invention further provides a method of preparing a co-polymer matrix, comprising:
a) combining:
 (i) methacrylate monomers having $R_1$ or $R_2$ pendant alkyl groups, wherein $R_1$ is any of $C_{1-3}$ alkyl groups and $R_2$ is any of $C_{4-12}$ alkyl groups;
 (ii) an ion exchanger comprising a functionalized C-derivative of a closo-dodecacarborane anion having a polymerizable group;
 (iii) an ionophore selective for said target ion;
 (iv) a cross-linking monomer; and
 (v) a polymerization initiator; and
b) treating said combination under conditions that allow said methacrylate monomers and said functionalized closo-dodecacarborane anion to copolymerize.

The sensors of the present invention may be carrier-based ion-selective electrodes (ISEs) or optodes such as thin film ion-specific optodes, particle-based optodes, or bulk optodes. Ion-specific optodes include miniaturized sensing platforms such as sensing films immobilized on the end of optical fibers, self-referencing microspheres, and nanoscale intracellular probes.

Additional features and advantages of this invention shall be set forth in part in the description that follows, and in part will become apparent to those skilled in the art upon examination of the following specification or may be learned by the practice of the invention. The advantages and novel features of this invention may be realized and attained by means of the instrumentalities, combinations, and methods particularly pointed out in the appended claims.

DESCRIPTION OF THE FIGURES

The above-mentioned and other features of this invention and the manner of obtaining them will become more apparent, and will be best understood by reference to the following description, taken in conjunction with the accompanying drawings. These drawings depict only a typical embodiment of the invention and do not therefore limit its scope, and serve to add specificity and detail.

In the Figures:

FIG. 1 shows the structures of Na-ionophore (X), chromoionophore ETH 5294, calcium ionophore AU-1, the tetraphenylborate derivative NaTFPB, and the closo-dodecacarborane anion.

FIGS. 6A and 6B are a calibration curves and corresponding experimental time traces, respectively, for the EMF measurements of an all-polymeric plasticizer-free calcium-selective membrane with both ionophore (AU-1) and ion-exchanger (TMCA) covalently grafted to the MMA-DMA polymer. The indicated calcium chloride concentrations in the sample range from $10^{-5}$ M to 1 M.

DETAILED DESCRIPTION OF THE INVENTION

Figure 2:
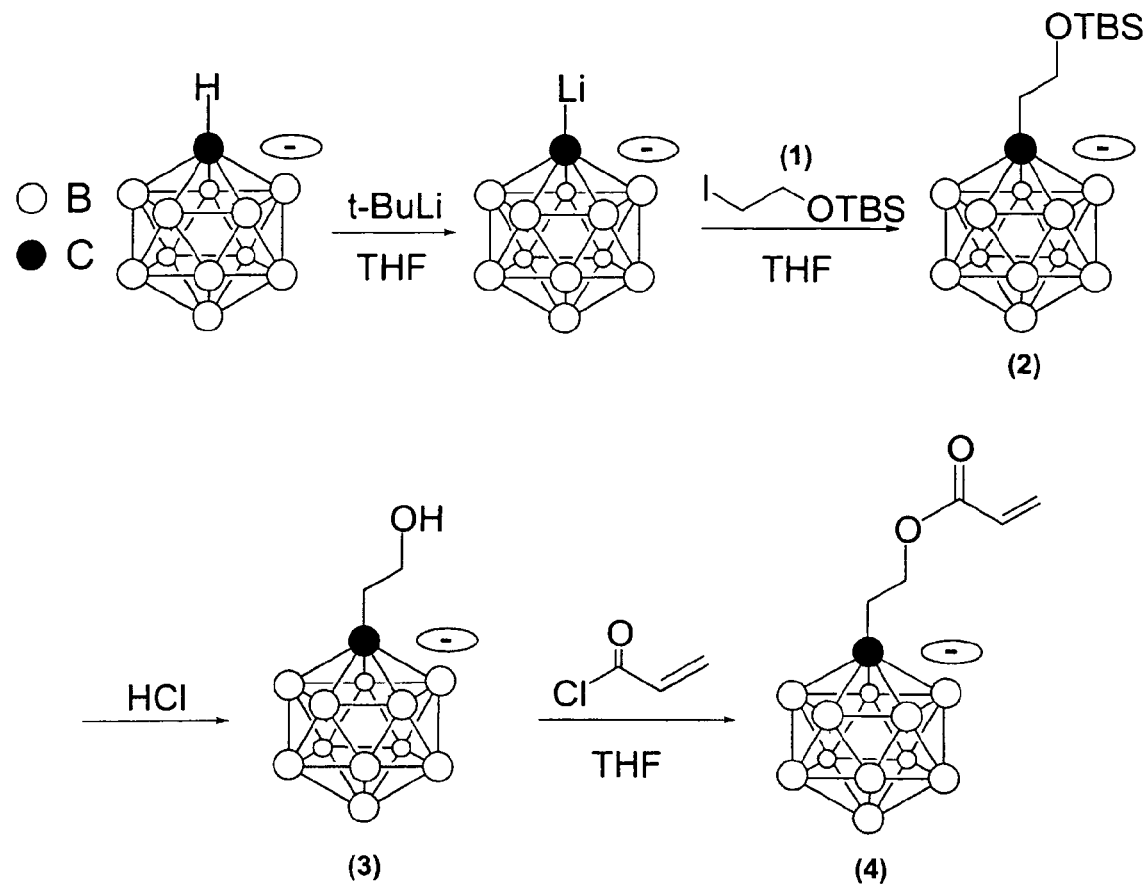
FIG. 2 shows the reaction scheme for the synthesis of the polymerizable carborane anion trimethylammonium 2-carborane ethyl acrylate (TMCA).

One aspect of this invention is based on the discovery that copolymers of methacrylate monomers and a functionalized dodecacarborane anion derivative are suitable matrices for preparing polymers comprising grafted ion exchangers, referred to as "graft polymers." The graft polymers of this invention can be used to prepare sensors such as ISE's and optodes for detecting target ions in a sample.

In one embodiment, an ion-detecting sensor for detecting a target ion in a sample comprises (i) a copolymer matrix comprising polymerized units of methacrylate monomers and an ion exchanger comprising a functionalized C-derivative of a closo-dodecacarborane anion, wherein said functionalized ion exchanger is grafted onto the copolymer through covalent linkages; and (ii) an ionophore for detecting the target ion, wherein said methacrylate monomers have $R_1$ or $R_2$ pendant alkyl groups wherein $R_1$ is any of $C_{1-3}$ alkyl groups and $R_2$ is any of $C_{4-12}$ alkyl groups. The copolymer may comprise a random distribution of immobilized ion exchanger within the polymer chain.

This invention further provides a novel C-derivative of the closo-dodecacarborane anion ($CB_{11}H_{12}^-$) having a polymerizable group as a chemically stable cation-exchanger. The term "closo-dodecacarborane" refers to a closed carborane cage comprised of 11 boron atoms and one carbon atom. More specifically, this invention further provides a novel polymerizable derivative of a dodecacarborane, said derivative having the structure (I):

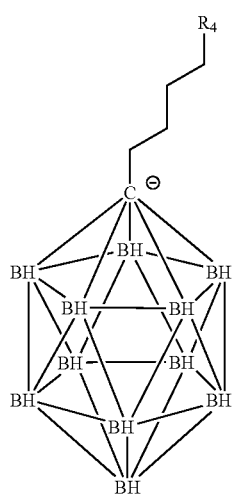

where $R_4$ is a polymerizable moiety.

The terms "polymerizable ion exchanger," "functionalized ion exchanger" and "functionalized dodecarborane" are used interchangeably and refer to an ion exchanger having a polymerizable reactive functional group which allows the ion exchanger to become covalently bonded to a copolymer. Examples of such functional groups include, but are not limited to, carbon-carbon double bonds such as acrylic and methacrylic groups, carbon-carbon triple bonds, and carbonyl groups. The functional group is required to allow the ion exchanger to react with a reactive group of the copolymer, such as a carbon-carbon double bond, so as to form covalent linkages, whereby the ion exchanger becomes covalently grafted onto the copolymer. In one embodiment, the ion exchanger is trimethylammonium 2-carborane ethylacrylate (TMCA), where $R_4$ is —O(C=O)CH=$CH_2$.

It was discovered that a co-polymer of methacrylate monomers comprising a covalently grafted novel ion exchanger of this invention exhibits mechanical properties suitable for the fabrication of plasticizer-free ion-selective membrane electrodes and bulk optode films. In addition, the sensors were found to be suitable for the physiological assessment of ions at neutral pH. For example, when ISE sensors were prepared with graft copolymers comprising MMA-DMA-TMCA, graft copolymers (i.e., TMCA covalently grafted into a MMA-DMA copolymer matrix), the sensors exhibited excellent response times (i.e., less than 5 minutes) relative to MMA-DMA copolymers containing free TMCA.

Sensors containing MMA-DMA-TMCA also exhibited mechanical properties suitable for the fabrication of plasticizer-free ion-selective membrane electrodes and bulk optode films by solvent casting and spin coating techniques.

Further, the copolymers of this invention have improved ion selectivity relative to similar methacrylate copolymers containing free (unbound) TMCA as well as conventional plasticized polymers containing the TMCA. Similarly, the copolymers of this invention demonstrated improved response times relative to conventional plasticizer-containing polymers.

The ion-detecting sensors of this invention offer several advantages when compared to conventional sensors. For example, anchoring the ion exchanger to the polymer by way of a covalent bond reduces diffusion of the ion exchanger across the polymer membrane relative to polymers containing unbound ion exchangers, which in turn improves the detection limit of the sensor.

The copolymer matrix of this invention includes a copolymer of the novel functionalized dodecarborane derivative and methacrylate monomers with different pendant alkyl groups $R_1$ and $R_2$, wherein $R_1$ may be any of $C_{1-3}$ alkyl group, and $R_2$ may be any of $C_{4-12}$ alkyl group, as described in U.S. patent application Ser. No. 10/313,090, which is specifically incorporated herein by reference.

As used herein, the term "alkyl" refers to a saturated linear or branched-chain monovalent hydrocarbon radical of one to twelve carbon atoms, wherein the alkyl radical may be optionally substituted independently with one or more substituents described below. Examples of alkyl groups include, but are not limited to, methyl, ethyl, n-propyl, isopropyl, butyl, isobutyl, sec-butyl, tert-butyl, pentyl, isopentyl, tert-pentyl, hexyl, isohexyl, and the like.

In accordance with embodiments of the present invention, preferably $R_1$ is a $C_{1-2}$ alkyl group, and $R_2$ is a $C_{8-12}$ alkyl group. In one embodiment, methyl methacrylate and decyl methacrylate monomers are used for forming a methyl methacrylate-decyl methacrylate (MMA-DMA) copolymer matrix of the present invention. Methacrylate monomers of the present invention are commercially available from, for example, Polysciences, Inc. (Warrington, Pa.). Alternatively, the methacrylate monomers can be prepared by standard methods known in the art or via thermally initiated free radical solution polymerization as described in copending U.S. patent application Ser. No. 10/313,090, which is incorporated herein by reference.

The terms "polymer" and "copolymer" are used interchangeably and refer to a chemical compound or mixture of compounds formed by polymerization and comprising repeating monomer units, wherein the polymer can comprise one type of monomer unit or can contain two or more different monomer units.

The co-polymer matrices of this invention further include an ionophore selective for the target ion to be detected. In one embodiment, the ionophore is a functionalized ionophore having a polymerizable group. In this embodiment, at least a portion of the functionalized ionophore may be covalently grafted onto a plasticizer-free matrix by copolymerizing the ionophore with methacrylate monomers such as MMA and DMA monomers, and the copolymer may comprise a random distribution of immobilized ionophore within the MMA-DMA polymer chain.

The terms "covalently grafted ionophore," "covalently anchored ionophore," and "covalently immobilized ionophore" are used interchangeably herein and refer to an ionophore that is attached to a polymer through covalent bonds.

The terms "functionalized ionophore" refers to an ionophore having a reactive functional group which allows the ionophore to become covalently bonded to a copolymer. Examples of such functional groups include, but are not limited to, carbon-carbon double bonds such as acrylic and methacrylic groups, carbon-carbon triple bonds, and carbonyl groups. A "polymerizable ionophore" is a functionalized ionophore comprising a polymerizable functional group.

The copolymers of the present invention which include a covalently grafted ionophore may be used in connection with a wide variety of ionophores for detecting different target ions, provided that the ionophore contains a functional group that allows it to be covalently grafted or anchored to a polymer matrix. The functional group is required to allow the ionophore to react with a reactive group of the copolymer, such as a carbon-carbon double bond, so as to form covalent linkages, whereby the ionophore becomes covalently grafted onto the copolymer.

Examples of functionalized ionophores suitable for purposes of this invention include hydrophilic crown ether-type ionophores, such as 4'-acryloylamidobenzo-15-crown-5 and 4'-acryloylamidobenzo-18-crown-6. Hydrophilic crown ethers of the type described herein are well known in the art and are commercially available or may be prepared using conventional synthetic techniques. When the functionalized ionophore is a hydrophilic crown ether, the ionophore is added in an amount between about 1-2% by weight. When the functionalized ionophore is AU-1, the ionophore is added in an amount between about 1% and 5% by weight, with 5% being preferred.

Other example of functionalized ionophores suitable for this invention include functionalized derivative of a 3-oxapentandiaminde-type calcium ion-selective ionophore, said derivative having the structure II:

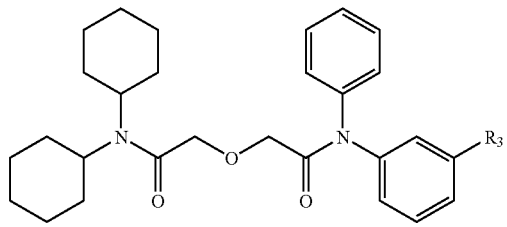

II where $R_3$ is a substituent comprising an unsaturated group. In one embodiment, $R_3$ is a polymerizable acrylic group —O(C=O)CH=CH$_2$, and this compound is referred to herein as AU-1, and which is described in U.S. Publication No. 2003/021,691, the contents of which are incorporated herein by reference.

The copolymers of the present invention comprising a covalently grafted novel ion exchanger of this invention may be made in accordance with methods known in the art or the methods described herein. For example, in one embodiment the graft copolymer is prepared by thermally initiated free radical solution polymerization of a mixture of methacrylate monomers and a functionalized ion exchanger as described herein in detail in Example 2. The solution further includes an ionophore, which may be a functionalized ionophore.

Alternatively, other methods known in the art may be used to covalently graft the exchanger to the matrix. For example, a sol-gel technique may be used to prepare the graft copolymer. Another approach involves directly grafting the ion exchanger onto an existing polymer with active sites. Yet another approach involves blending two different polymers together, with one of them containing the grafted ion exchanger. Alternatively, a solution containing methacrylated monomers and the functionalized ion exchanger of this invention can be irradiated with an electron beam to cause polymerization and covalent attachment of the functionalized ion exchanger onto the methacrylate copolymer.

The amount of each monomeric subunit needed to produce copolymers with a desired glass transition temperature $T_g$ for optimal mechanical strength may be calculated using the Fox equation. The $T_g$ is typically determined experimentally with a differential scanning calorimeter, a standard instrument for this purpose. Polymers with very low $T_g$ values are normally much softer and more difficult to handle mechanically. A sufficient amount of a functionalized ion exchanger of this invention is combined with the copolymer to obtain the desired improvement in desired properties of the copolymer, such as ion selectivity and response time. Such properties may be quantitatively measured by well-known test methods. In accordance with embodiments of the present invention, a copolymer of the present invention has a glass transitional temperature ($T_g$) of about or less than 0° C.

The precise minimum amount of functionalized ion exchanger required to produce a significant enhancement of such properties will, of course, vary depending upon the chemical compositions, structures, and molecular weights of the components employed as well as the extent of grafting achieved. In general, however, it will be advantageous to use at least one part by weight of the functionalized ion exchanger for every 100 parts by weight of the copolymer.

The conditions necessary to achieve at least partial grafting of the components of the polymer composition will vary depending upon the reactivities of the individual components. For example, when the ion exchanger and/or ionophore comprises an acrylic functional group (as with the ion exchanger TMCA and the ionophore AU-1) which can react with the methacrylate monomer unit of the copolymer, then the grafting conditions may comprise a thermal or photoinitiated co-polymerization in an organic solvent such as benzene. For example, when TMCA was grafted onto MMA-DMA, the amount of TMCA that polymerized with the MMA and DMA monomers was measured to be about 61%.

In one embodiment, the graft copolymers of this invention may be blended, admixed, or combined with other polymers to obtain blends having improved properties or performance characteristics. For example, the polymer composition when blended with poly(vinyl chloride) and a plasticizer has the beneficial effect of increasing the response time of the graft polymer. The relative proportion of PVC-plasticizer to graft polymer composition may be varied as desired, preferably from about 90:10 to 80:20 on a weight basis.

The graft polymers of the present invention may be used to fabricate plasticizer-free ion-selective membranes or particles for a variety of sensors including, but not limited to, carrier-based ion-selective electrodes (ISEs), thin film ion-specific optodes, particle-based optodes, and bulk optodes, ultraminiaturized ion-specific probes and nanoscale intracellular probes, and low detection limit sensors. Examples of ultraminiaturized ion-specific probes sensing films immobilized on the end of optical fibers and self-referencing microspheres. For example, a graft polymer of this invention may be used to fabricate polymer membranes of an ISE in accordance with methods described in Example 2 of the present invention or any other methods known to one skilled in the art. Polymers of this invention may also be used to fabricate thin films to be used in a thin film ion-specific optode or to fabricate microsphere particles to be used in particle-based optodes in accordance with methods known in the art. The electrodes and optodes may be prepared, for example, by solvent casting and spin coating techniques.

When an ion-detecting sensor of the present invention is in a form of optodes, the sensor further includes an indicator ionophore. Examples of indicator ionophores include, but are not limited to, a pH indicating chromoionophore, a chromoionophore, a fluoroionophore, a pH indicator, or a pH indicating fluoroionophore.

The ion-detecting sensors of the present invention may be used for detecting ions of all types of body fluid samples. Examples of the samples include, but are not limited to, whole blood, spinal fluid, blood serum, urine, saliva, semen, tears, etc. The fluid sample can be assayed neat or after dilution or treatment with a buffer.

EXAMPLES

Reagents. Trimethylammonium chloride, butyl lithium, 2-iodoethanol, butyldimethylsilyl chloride (TBSCl), imidazole, acryloyl chloride and triethylamine were of the highest grade from Aldrich (Milwaukee, Wis.). Cesium carborane was purchased from Strem Chemicals (Newburyport, Mass.). N,N-Dicyclohexyl-N'-phenyl-N'-3-(2-propenoyl) oxyphenyl-3-oxapentanediamide (AU-1) was synthesized as reported.[24] All solvents used for syntheses were obtained from Fisher Scientific (Pittsburgh, Pa.) and dried before using.

The monomers methyl methacrylate, 99.5% and n-decyl methacrylate, 99% were obtained from Polysciences, Inc. (Warrington, Pa.). The polymerization initiator 2,2'-azobisisobutyronitrile, 98%, (AIBN) was obtained from Aldrich. Benzene, dichloromethane and 1,4-dioxane were reagent grade and obtained from Fisher. Benzene and dichloromethane were purified by fractional distillation after refluxing with calcium hydride for 4 h. Inhibitors were removed from the monomers by washing with a caustic solution containing 5% (w/v) NaOH and 20% NaCl in a 1:5 ratio (monomer:caustic solution) and water. The organic phase was separated and dried with anhydrous $Na_2SO_4$. This purification process has previously been reported. AIBN was recrystallized from warm methanol prior to use. 4-tert-butylcalix[4]arene tetraacetic acid tetraethyl ester (Na-ionophore X), 9-(diethylamino)-5-octadecanoylimino-5H-benzo[a]phenoxazine (chromoionophore I, ETH 5294), sodium tetrakis[3,5-bis(trifluoromethyl)phenyl]borate (NaTFPB), Cyanoaqua-cobyrinic acid heptakis(2-phenylethyl ester) (Nitrite ionophore I), o-nitrophenyloctylether (NPOE), bis (2-ethylhexyl)sebacate (DOS), high molecular weight poly (vinyl chloride), tetrahydrofuran (THF) and all salts were purchased in Selectophore or puriss quality from Fluka (Milwaukee, Wis.). Tris(hydroxymethyl)aminomethane (TRIS) was of ACS grade from Aldrich. Chloride salts of sodium, potassium, calcium and magnesium were of puriss. quality from Fluka. Aqueous solutions were prepared by dissolving the appropriate salts in Nanopure purified water (18 MΩ cm).

The invention is further illustrated by the following non-limiting examples. All scientific and technical terms have the meanings as understood by one with ordinary skill in the art. The specific examples which follow illustrate the methods in which the compositions of the present invention may be prepared and are not to be construed as limiting the scope of the invention. The methods may be adapted to variation in order to produce compositions embraced by this invention but not specifically disclosed. Further, variations of the methods to produce the same compositions in somewhat different fashion will be evident to one skilled in the art.

Example 1

Synthesis of Trimethylammonium 2-carborane ethylacrylate (TMCA)

Preparation of $I(CH_2)_2OTBS$ (1): To a solution of 2-iodoethanol (3 g, 17 mmol) and imidazole (1.74 g, 25 mmol) in 20 mL anhydrous dichloromethane was added TBSCl (2.82 g, 18.7 mmol). The mixture was stirred at room temperature overnight (12 hours). The reaction mixture was washed with water (2×10 mL), brine (10 mL) and dried over $Na_2SO_4$. Removal of the solvent afforded pure product $I(CH_2)_2OTBS$ (1) (5.6 g, 98% yield, MW: 286.02).

Preparation of $[Me_3NH][TBSO(CH_2)_2-CB_{11}H_{11}]$ (2): n-Butyllithium (5.5 mmol) was added to a solution of $[Me_3NH][closo-CB_{11}H_{12}]$ (0.2 g, 1 mmol) in 15 mL anhydrous THF at 0° C. under $N_2$. The mixture was brought to room temperature and stirred for 1 hour. Compound 1 (0.372 g, 1.3 mmol) in 3 mL THF was added dropwise in a period of 5 min. After the reaction was stirred at room temperature for 15 hour, the solvent was removed. $Me_3NHCl$ (6 mmol) in 10 mL water was added to the residue. A pale yellow solid was formed. Filtration gave mainly the desired product. Further purification was done by column chromatography ($CH_2Cl_2:CH_3CN=4:1$) and afforded the white solid $[Me_3NH][TBSO(CH_2)_2-CB_{11}H_{11}]$ (2) (0.25 g, 50% yield, MW: 361.26). $^1H$ NMR: $\delta_H$ (250 MHz; $CDCl_3$) 4.28 (m, 2H), 3.77 (m, 2H), 3.44 (s, 9H), 2.60-0.60 (m, 11H), 0.91 (s, 9H), 0.15 (s, 6H); $^{13}C$ NMR: $\delta_C$ (62.9 MHz; $CDCl_3$) 68.8, 58.3, 54.8, 51.7, 26.3, 18.6, −5.5.

Preparation of $[Me_3NH][HO(CH_2)_2-CB_{11}H_{11}]$ (3): Compound 2 (0.15 g 0.40 mmol) was dissolved in 5 mL THF, and 5 mL of 1 N HCl was added. The reaction solution was stirred at room temperature for 4 hour. The solvent was removed and a white solid precipitated from the aqueous solution. Filtration gave pure product 3 (0.10 g, 90% yield, MW: 194.33). $^1H$ NMR: $\delta_H$ (250 MHz; $CDCl_3$) 4.22 (br, 1H), 4.17 (m, 2H), 3.73 (m, 2H), 3.44 (s, 9H), 2.62-0.58 (m, 11H); $^{13}C$ NMR: $\delta_C$ (62.9 MHz; $CDCl_3$) 68.5, 56.5, 54.4, 51.2.

Preparation of $[Me_3NH][CH_2CHCOO(CH_2)_2-CB_{11}H_{11}]$ (TMCA) (4) The above solid was dissolved in 10 mL THF at 0° C. $Et_3N$ (0.66 mmol) was added. To this solution, acryloyl chloride (0.50 mmol) in 2 mL THF was added dropwise by a syringe. The reaction was stirred at the same temperature for 0.5 hours after which time it was warmed to room temperature over 1 hour. The solvent was removed and 20 mL EtOAc was added. The solution was washed with water and brine and dried over $Na_2SO_4$. The solvent was removed and the residue was purified by column chromatography ($CH_2Cl_2:CH_3CN=3:1$) to give the final product TMCA (4) as a white solid (80 mg, 50% yield, MW: 301.25). $^1H$ NMR: $\delta_H$ (250 MHz; $CDCl_3$) 6.58 (dd, 1H), 6.27 (dd, 1H), 5.88 (dd, 1H), 4.02 (m, 2H), 3.57 (m, 2H), 3.44 (s, 9H), 2.42-0.78 (m, 11H).

Example 2

Polymer Synthesis

All polymers were synthesized via thermally initiated free radical solution polymerization. The amount of methyl methacrylate and n-decyl methacrylate used was the same as reported previously.[23] For polymers containing grafted $Ca^{2+}$-selective ionophores, 5 wt % AU-1 was used. For polymers containing grafted cation-exchanger, 2 wt % TMCA (50 mg, 66 mmol/kg) was used. Calculated amounts of MMA (0.48 g) and DMA (1.97 g)[23] were added to 5 mL of dry benzene for AU-1 or ethyl acetate for TMCA. The solution was purged with $N_2$ for 10 min before adding 5.1 mg of AIBN. The homogeneous solution was continuously stirred and the temperature was ramped to 90° C., which was maintained for 16 hours. After the reaction was complete, the solvent was evaporated and the polymer redissolved in 10 mL of dioxane. Aliquots of polymer solution (2 mL) were added to 100 mL of distilled water under vigorous stirring. The white precipitate was collected and dissolved in 25 mL of dichloromethane and washed with water. The organic phase was separated and followed by water removal with anhydrous $Mg_2SO_4$ and filtering. The solvent was evaporated and the resultant transparent polymer was dried under ambient laboratory conditions. By analyzing the peak intensities for the counter-cation of the carborane according to the reported method,[19,24] the concentration of the grafted TMCA in MMA-DMA polymer was estimated from the $^1H$ NMR spectrum as 40 mmol/kg (61% yield).

Example 3

ISE Membrane Preparation and Potentiometric Measurements

Ionophore-free ISE membranes were prepared by dissolving 10 wt % MMA-DMA polymer with grafted TMCA, 90 wt % PVC and plasticizer (DOS or NPOE) (1:2) to give a total cocktail mass of 140 mg in 1.5 mL of THF.

Nitrite selective membranes contained 10 mmol/kg Nitrite-ionophore I, 10 wt % MMA-DMA polymer with grafted TMCA, 90 wt % PVC and NPOE (1:2) to give a total cocktail mass of 140 mg in 1.5 mL THF.

For the plasticizer-free membrane with grafted calcium ionophore AU-1 and grafted ion-exchanger TMCA, the cocktail contained 35 mg MMA-DMA-AU-1, 30 mg MMA-DMA-TMCA and 75 mg blank MMA-DMA polymer in 1.5 mL THF.

Cocktails were poured into glass rings (2.2 cm i.d.) affixed onto glass microscope slides. The solvent was evaporated overnight to give a transparent membrane. The plasticizer free MMA-DMA membrane was soaked in water for 1 hour and carefully peeled from the glass slide with a scalpel. The membranes containing TMCA were preconditioned in 1 mM LiOH for 5 hours in order to extract trimethylammonium into the aqueous solution. The membranes were then conditioned overnight in 0.01 M $MgCl_2$ or 0.01 M NaCl solutions. Discs 6 mm in diameter were cut from the parent membranes and mounted into Philips electrode bodies (IS-561, Glasbläserei Möller, Zurich, Switzerland). 0.01 M $MgCl_2$ was used as the inner filling solution for the unbiased selectivity measurements[41] of ionophore-free membranes and plasticizer-free membranes with grafted AU-1 and TMCA. 0.01 M NaCl was used as the inner filling solution for the measurements of Nitrite-ionophore I based membranes. The electrodes were measured in different sample solutions versus a Ag/AgCl reference electrode with a 1 M LiOAc bridge electrolyte. All of the experimental results are the average of at least three electrodes, with calculated standard deviations.

Example 4

Optode Leaching Experiments

For optode thin films in leaching experiments, a total of 300 mg membrane components containing 20 mmol/kg Na-ionophore (X), 10 mmol/kg free TMCA or 45 mg MMA-DMA-TMCA, 6 mmol/kg ETH 5294, PVC and DOS (1:2) were dissolved in 1.75 mL THF. A 200-µL aliquot of the cocktail was transferred with a syringe onto a quartz disk placed in a spin-coating device.[42] For each cocktail, two films of the same composition were cast. The films were placed in a flow-through cell after drying in air for 1 hour. The flow cell was then mounted into a Hewlett-Packard 8452A diode array UV-visible spectrophotometer. 1 mM TRIS-HCl buffer (pH 7.46) was used to continuously flow through the cell at a rate of 1.2 mL/min. Absorption spectra were recorded between 300 and 800 nm at 1 minute intervals.

Example 5

Response Time Experiments

The optode thin films (from a total of 300 mg membrane components) were prepared by the same spin-coating device as in the procedures described above. Optode I contained 20 mmol/kg Na-ionophore (X), 10 mmol/kg NaTFPB, 5 mmol/kg ETH 5294, 15 wt % blank MMA-DMA, 85 wt % PVC and DOS (1:2). Optode II contained 20 mmol/kg Na-ionophore (X), 15 wt % mg MMA-DMA-TMCA, 5 mmol/kg ETH 5294, 85 wt % PVC and DOS (1:2). The films were placed in a flow-through cell and measured by UV-Vis. A flow rate of 5 mL/min was used for rapid solution exchange. About 0.5 min was needed to replace the solution in the flow-through cell.

Example 6

Optode $Na^+$ Response

For the Na-ionophore (X)-based optode, the spin-coated films were prepared with the same procedure and composition as described above. The 2-3 µm-thick spin-coated films were equilibrated in different sample solutions containing chloride salts of sodium, potassium, magnesium and calcium with 1 mM TRIS buffer (pH 7.46) and characterized by fluorescence spectroscopy as previously reported.[6,43] All the data points are the average of five measurements, with calculated standard deviations.

Results and Discussion

The present invention provides a novel, polymerizable C-derivatized carborane anion (TMCA), which was synthesized according to the procedure shown in FIG. 2. Unlike the synthesis of boron derivatives, the commercially available cesium carborane ($CsCB_{11}H_{12}$) could not be used for the direct lithiation at the carbon atom due to the marked insolubility of $Cs[1\text{-Li }CB_{11}H_{12}]$ which inhibits the subsequent substitution chemistry.[44] Therefore, it was important to first convert the parent $CsCB_{11}H_{12}$ into a trimethylammonium salt, which was then reacted with butyllithium to produce a soluble form of the C-litho derivative, $1\text{-LiCB}_{11}H_{12}^-$. The by-products, butane and trimethylamine, could be easily removed by evaporation. Treatment of this litho-derivative in situ with TBSCl protected 2-iodoethanol provided the C-alkyl derivative 3 that could be precipitated by the addition of trimethylammonium chloride. After removal of the protecting group by acid-hydrolysis, compound 3 was reacted with acryloyl chloride to obtain the polymerizable carborane anion 4 (TMCA) with trimethylammonium as counter cation. This new derivative has a good solubility in ethyl acetate and cocanuld be copolymerized with methyl methacrylate and decyl methacrylate in ethyl acetate by a one-step solution polymerization. The polymer with grafted carborane anions was transparent and elastic, similar to unmodified MMA-DMA copolymer. On the other hand, it was softer and stickier than blank MMA-DMA, with an increased tendency to deform under mechanical or hydrodynamic pressure.

The covalent attachment of the ion-exchanger was confirmed by performing leaching experiments from optode films. Thin PVC-DOS films contained a $Na^+$ ionophore, the $H^+$-chromoionophore ETH 5294 and either the covalently attached or the dissolved carborane ion-exchanger. The UV/Vis spectrum of the chromoionophore shows protonated and deprotonated absorption maxima at 650 nm and 550 nm, respectively.[45] In a pH 7.46 buffer without $Na^+$, the chromoionophore is protonated in the presence of cation-exchanger ($R^-$). As the cation-exchanger leaves the film due to insufficient lipophilicity, a hydrogen ion must be extracted from the chromoionophore to satisfy electroneutrality. This slow deprotonation process can be conveniently followed by UV/Vis spectroscopy.[32] For the films with unsubstituted carborane $CsCB_{11}H_{12}$ as cation-exchanger, the chromoionophore could never be protonated due to the high solubility of cesium carborane in aqueous solution.

Figure 3:
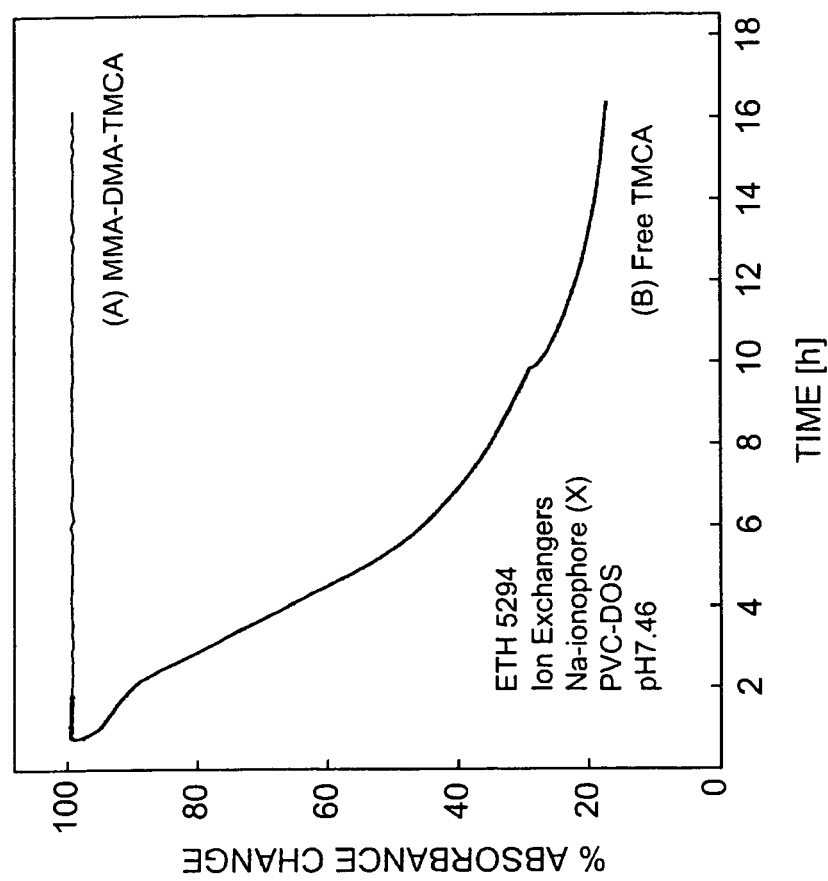
FIG. 3 is a graph of % absorbance change verses time (hours) for PVC-DOS (2:1) optode films containing Na-ionophore (X), ETH 5294, and grafted carborane anions (curve A), or free carborane anions (curve B), monitored by the change in absorbance of the protonated form at 650 nm.

FIG. 3 shows the observed leaching behavior, under continuous flowing conditions, of PVC-DOS films containing either the free or the covalently attached carborane anion derivative TMCA. Compared to the unsubstituted cesium carborane, the polymerizable carborane anion (TMCA) has an improved lipophilicity since protonation of the chromoionophore can be observed. Still, it eventually leached out of the film quantitatively as shown in FIG. 3, trace B. In order to have a direct comparison to the PVC-DOS films containing the free ion-exchanger, the optode films with grafted carborane anion were prepared by doping 15 wt % MMA-DMA-TMCA into PVC-DOS. The resulting films were transparent and homogenous. The trace of absorbance with time (FIG. 3, trace A) shows that the absorbance for ETH 5294 was stable for 16 hours under the same conditions and flow rate as for trace B. This strongly confirms that the ion-exchanger was indeed covalently attached to the polymer matrix and that the resulting optode films show much improved lifetimes.

It is known that the linear MMA-DMA polymer has some similarity to DOS plasticized membranes such as an abundance of ester groups and a comparable dielectric constant.[23] The mixing of some MMA-DMA polymer with excess PVC-DOS can produce compatible and homogenous membranes that do not show significant changes in membrane and diffusion properties.[23] A rapid leaching of free polymerizable carborane derivative (TMCA) in PVC-DOS membrane containing 15 wt % blank MMA-DMA was also observed and indicated that the free carborane anion cannot be physically entrapped in such a matrix (data not shown). Therefore, trace A in FIG. 3 strongly suggests that the ion-exchanger was indeed covalently attached to the polymer matrix.

To further study the basic ion-exchange properties of the grafted carborane anion, the response of a $Na^+$ selective optode was measured. The PVC-DOS film contained a sodium selective ionophore, ETH 5294 and MMA-DMA-TMCA. The MMA-DMA polymer with grafted carborane anions was quite soft so it was blended with other polymer materials with improved physical and mechanical properties such as the MMA-DMA copolymer or plasticized PVC. However, in most cases completely plasticizer-free methacrylate copolymer optode films showed slower diffusion behavior and much longer response time than plasticized PVC films.[25] It has been reported that relatively fast response times (less than 15 minutes) could be obtained if 10 wt % MMA-DMA polymer with a covalently attached calcium ionophore was blended with PVC and DOS.[24] Therefore, PVC-DOS was used as an initial model polymer matrix and plasticizer to evaluate the basic properties of the covalently attached carborane anion. In the present invention, a 15 wt % MMA-DMA copolymer with grafted TMCA was mixed with 85 wt % PVC and DOS. The sensing principle for such an optode containing a neutral sodium ionophore L forming a complex with stoichiometry "n," a $H^+$-chromoionophore "Ind," and a cation-exchanger "$R^-$" is based on an ion-exchange mechanism between an analyte $I^+$ and $H^+$ as shown in Equation 1:[42]

$$IndH^+(org)+n\ L(org)+I^+(aq)+R^-(org)=Ind(org)+nLI^+(org)+H^+(aq)+R^-(org) \quad (1)$$

The organic film phase and the aqueous phase are indicated as (org) and (aq), respectively. The equilibrium according to Equation 1 can only be observed over the entire measuring range if all of the covalently attached ion-exchanger is chemically accessible. Successful recording of an optode response curve, therefore, should be evidence that covalently attached ion-exchangers are truly useful in ion sensor applications. The sodium activity in a given sample was determined by using the fluorescence emission of the neutral chromoionophore ETH 5294. Peaks at 647 and 680 nm, corresponding to the deprotonated and protonated forms of the chromoionophore, respectively, were used to monitor ion exchange. As sodium ions enter the film, hydrogen ions are exchanged out of the film and the chromoionophore is deprotonated to conserve electroneutrality. Again, this leads to a measurable change in its fluorescence properties. This corresponds to a decrease in fluorescence intensity at 680 nm, and conversely, an increase in the deprotonated emission peaks at 647 nm. By taking the ratio of these two emission peaks, a response curve may be generated.

The use of ratiometric fluorescence measurements to normalize response curves in term of degree of protonation of the chromoionophore has been reported.[43,46] The response of the films based on the ion-exchange equilibrium according to Equation 1, given as a function of the experimentally accessible mole fraction of unprotonated chromoionophore, $\alpha$, and ion activities of the two ions ($\alpha_I$ and $\alpha_H$) is written as shown in Equation 2:[42,47]

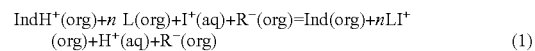

$$a_I = (z_1 K_{exch})^{-1}(\alpha a_H)/(1/\alpha))^{z_I} \frac{[R_T^- - (1-\alpha)C_T]}{\{L - (R_T^- - (1-\alpha)C_T)(n/z_1)\}^n} \quad (2)$$

where $L_T$, $C_T$ and $R_T^-$ are the total concentrations of ionophore, chromoionophore and lipophilic ion-exchanger, respectively, $z_I$ is the charge of the analyte (for sodium, $z_I$=1), and $K_{exch}$ is the ion-exchange constant (to describe Equation 1).

Figure 4:
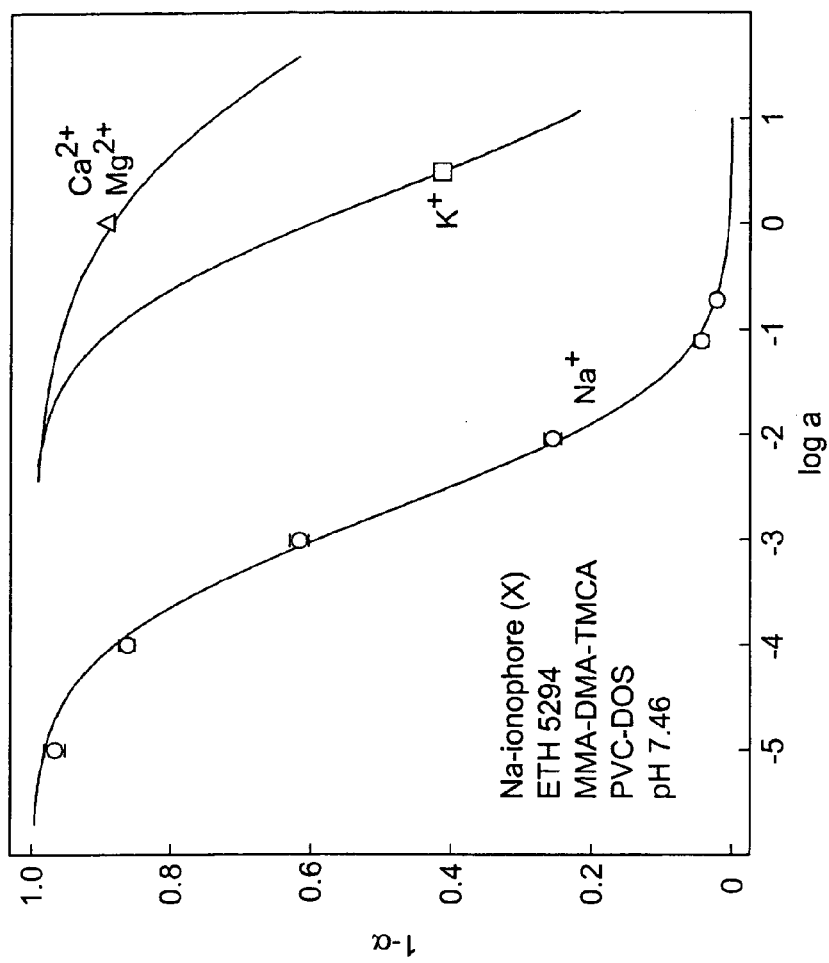
FIG. 4 is a graph of the normalized optode response curves and selectivity of PVC-DOS film containing Na-ionophore (X), MMA-DMA-TMCA and the chromoionophore ETH 5294 towards sodium (open circles), magnesium, potassium and calcium ions measured at pH 7.46 (n=5). The lines are theoretically predicted responses according to Equation 2, with log $K_{exch}$=−4.80 for Na$^+$(n=1), −7.85 for K$^+$(n=1), −17.50 for Ca$^{2+}$(n=1), and −17.55 for Mg$^{2+}$(n=1).

The observed response curve of the optode film towards $Na^+$ and the observed selectivity to potential interferences ($K^+$, $Mg^{2+}$, $Ca^{2+}$) are shown in FIG. 4. The data points correspond to mean experimental values (n=5) with the error bars denoting standard deviations (often smaller than plot symbols). The lines describe the theoretical curves according to Equation 2. The response curve generated with Na-ionophore (X), ETH 5294 and MMA-DMA-TMCA- corresponds very well to the theoretically predicted response, which confirms that the cation-exchanger remains fully functional in a covalently bound state. The observed ion-exchange constant was found to be log $K_{exch}$=−4.8. The selectivity coefficient of $Na^+$ over $K^+$, $Mg^{2+}$ and $Ca^{2+}$ was determined in 1 M solutions as $logk^{Osel}$ of −3.05, −4.84, −4.79 (at half protonation of the chromoionophore).[47] In contrast, PVC-DOS films containing the ionophore, the chromoionophore ETH 5294 and free polymerizable carborane derivative (TMCA) as ion exchanger could not give optimal sodium response. The films could initially be protonated in pH 7.4 buffer without sodium ions, but gradually became deprotonated in the same solution because the ion exchangers leached out of the films due to the insufficient lipophilicity of the compound. Similarly, PVC-DOS films with both ionophores but without any added ion exchanger could not be protonated at pH 7.4, as expected.

Figure 5:
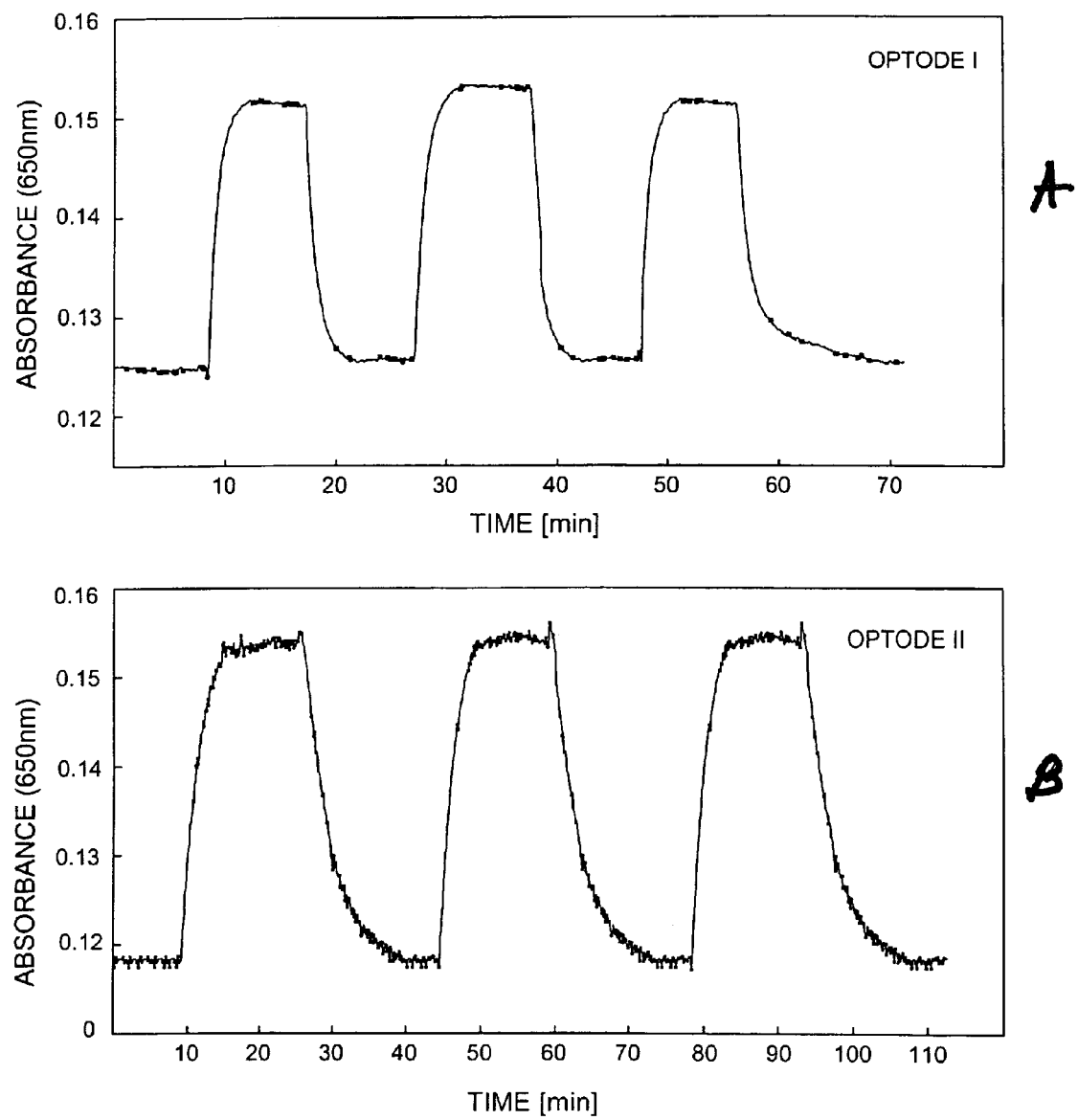
FIGS. 5A and 5B are graphs showing the response time comparison of PVC-DOS optode thin films containing Na-ionophore (X), ETH 5294, and either NaTFPB in addition to 15 wt % blank MMA-DMA (5A) and TMCA covalently grafted to MMA-DMA (5B). The absorbance values were recorded at 650 nm. Concentrations were changed between $10^{-4}$ M and $10^{-3}$ M Na$^+$ at a flow rate of 5 mL/min.

In FIGS. 5A and 5B, the response times of the optode films containing free and grafted ion-exchangers are compared by using a flow-through cell and UV-Vis detection. Optode I (FIG. 5A) contained the sodium ionophore and free ion exchanger NaTFPB in a matrix consisting of 15 wt % blank MMA-DMA and 85 wt % PVC-DOS. Optode II (FIG. 5B) contained the same ionophore in a matrix of 15 wt % MMA-DMA with grafted ion-exchanger TMCA and 85 wt % PVC-DOS. It was reported that the covalent attachment of the chromoionophore in PVC slowed the response of the film.[27] As shown in FIGS. 5A and 5B, upon a 10-fold increase or decrease of $Na^+$ concentration, optode I (with free ion exchanger) showed response times of less than 5 min. Under the same conditions optode II (with grafted ion exchanger) exhibited longer response times, with a deprotonation time of about 15 minutes. This is reasonably fast in view of further miniaturization, and compares well to other optodes with immobilized ionophore.[27] The result indicates that the different deprotonation rates are not due to the mixing of the different polymer materials but rather to the covalent attachment of active components in the polymer. In addition, the covalent attachment of the ion-exchanger did not appear to slow the response time of the sensor dramatically if it is blended with plasticized PVC. The optode experiments suggest that the methacrylate polymer with grafted carborane anion appears to be a suitable cation-exchanger for ion-selective sensors.

In addition to the optical experiments, the potentiometric response and selectivity of membranes with grafted carborane anion in ion-selective membranes were evaluated. First, ionophore-free membranes containing only ion-exchanger were measured potentiometrically because ion pairing effects have their strongest influence on membrane selectivity under such conditions.[32] Three different ion-exchangers, grafted TMCA, free $TFPB^-$ and free $UBC^-$ were compared. A PVC-DOS membrane with 10% MMA-DMA-TMCA as ion-exchanger again appeared to be clear and homogeneous upon visual inspection. The membrane had response times comparable to the plasticized PVC membranes with free ion-exchangers. Slopes and selectivity of the membranes were determined by unbiased selectivity measurements (Table 1).[48] PVC-DOS membranes with MMA-DMA-TMCA exhibited Nernstian or near-Nernstian slopes to all the ions measured. The selectivity pattern observed with the copolymer membrane was the same as that demonstrated elsewhere for an all-MMA-DMA matrix containing NaTFPB.[23] In ionophore-free membranes the selectivity is dictated by the hydration enthalpies of the sample ions.[2] As shown in Table 1, the selectivity pattern indeed followed the increase of the lipophilicity of the cations. This indicates that the ion-exchange properties of covalently attached carborane anions are similar to those found in established PVC-DOS membranes containing NaTFPB.

TABLE 1

Slopes and selectivity coefficients of ionophore-free PVC-DOS membranes containing different cation-exchangers

| ions | Grafted TMCA | | TFPB[37] | | UBC[37] | |
| --- | --- | --- | --- | --- | --- | --- |
| | slope | $logK_{Na,J}^{pot}$ | slope | $logK_{Na,J}^{pot}$ | slope | $logK_{Na,J}^{pot}$ |
| $Mg^{2+}$ | 22.1 ± 1.5 | −3.15 ± 0.05 | 24 ± 3 | −2.37 ± 0.08 | 22.7 ± 0.7 | −2.91 ± 0.03 |
| $Ca^{2+}$ | 28.5 ± 2.4 | −2.94 ± 0.01 | 28 ± 1 | −2.0 ± 0.1 | 29 ± 2 | −2.57 ± 0.04 |
| $Li^+$ | 58.5 ± 0.1 | −0.43 ± 0.01 | 58.4 ± 0.5 | −0.27 ± 0.02 | 57.6 ± 0.2 | −0.14 ± 0.01 |
| $Na^+$ | 59.8 ± 0.3 | 0 | 58.9 ± 0.7 | 0 | 56.5 ± 0.1 | 0 |
| $K^+$ | 60.6 ± 0.1 | 0.26 ± 0.02 | 59.1 ± 0.6 | 0.55 ± 0.02 | 56.6 ± 0.1 | 0.45 ± 0.01 |

The MMA-DMA polymer with grafted carborane anion was also tested in charged carrier based ion-selective membrane. It is known that the electrically charged ionophore does in principle not require an ion-exchanger to maintain electroneutrality in the membrane and to yield functional sensors.[49] However, the use of an ion-exchanger with opposite charge to the ionophore may induce the highest possible selectivity of the electrode by creating a defined amount of uncomplexed ionophore.[50] To further demonstrate the function of the grafted ion-exchanger, the nitrite ionophore I was taken as an example of a positively charged ionophore (see FIG. 1). It has been reported that $NO_2^-$ (I) based membranes with anion-exchanger (TDMACl) result in the loss of nitrite selectivity; instead, the membranes showed selectivity according to the Hofmeister series.[50] On the contrary, the addition of cation-exchangers could improve the selectivity by more than one logarithmic unit. The overall ratio of KTFPB was found to be optimal between 10 and 60 mol %.[50] In the present invention, PVC-NPOE membranes without any additives and with grafted carborane anions were measured potentiometrically. Their selectivities are compared to the literature values of $TFPB^-$ based membranes in Table 2. The selectivity of the membrane with only $NO_2^-$ (I) was repeated in the present invention, with results that were close to the literature values. By adding grafted TMCA as cation-exchanger, the selectivity of $NO_2^-$ over $SO_4^{2-}$, $OAc^-$, $Cl^-$, $NO_3^-$ and $ClO_4^-$ improved by almost one order of magnitude. The selectivity values were also very close to the example having with an optimized amount of KTFPB. These results again demonstrate the function and capability of MMA-DMA polymers with covalently attached carboranes.

components. Sub-Nemstian response slopes toward interfering ions yield only upper limits for selectivity coefficients.[48] FIG. 6B shows the potential-time traces for the membrane

TABLE 2

Slopes and selectivities of Nitrite ionophore I based PVC-NPOE membranes containing either no ionic sites, NaTFPB or grafted TMCA

| J | No sites[50] $\log K_{NO_2,J}^{pot}$ | 37 mol % TFPB[-50] $\log K_{NO_2,J}^{pot}$ | No sites $\log K_{NO_2,J}^{pot}$ | With grafted TMCA slope | $\log K_{NO_2,J}^{pot}$ |
|---|---|---|---|---|---|
| $SO_4^{2-}$ | −3.1 | −4.1 | −3.14 ± 0.05 | — | −4.14 ± 0.08 |
| $OAc^-$ | −3.0 | −3.8 | −2.72 ± 0.08 | — | −3.71 ± 0.06 |
| $Cl^-$ | −3.0 | −3.7 | −3.07 ± 0.08 | 32.3 ± 1.1 | −3.67 ± 0.03 |
| $NO_3^-$ | −2.7 | −3.4 | −2.80 ± 0.04 | 48.2 ± 2.3 | −3.52 ± 0.08 |
| $ClO_4^-$ | −1.0 | −1.8 | −0.55 ± 0.02 | 53.3 ± 0.5 | −1.68 ± 0.01 |
| $SCN^-$ | 0.4 | 0.3 | 0.42 ± 0.07 | 58.4 ± 0.3 | 0.17 ± 0.09 |
| $NO_2^-$ | 0 | 0 | 0 | 56.8 ± 1.0 | 0 |

As discussed, plasticized PVC membranes are not really desired in view of an application in biological samples, especially when sensors are drastically miniaturized. Therefore, the ultimate goal is the fabrication of all-polymeric sensing membranes that contain no leachable components. Some work in this direction has already been reported. Polysiloxane based CHEMFET[10] and modified sol-gel[17] sensors where both ionophore and ion-exchanger were covalently immobilized have been described. Such membranes exhibited Nemstian responses and good selectivities for $Na^+$ and $K^+$. However, such CHEMFET sensors based on polysiloxane with grafted lead ionophore and cation-exchanger had no linear response to $Pb^{2+}$, which at the time was explained by the insufficient exchange of $Pb^{2+}$ with $K^+$ (the counter ions of borates) because the divalent charge of $Pb^{2+}$ could presumably not be efficiently compensated by the covalently attached ion-exchanger.[28]

The present invention provides the first calcium selective plasticizer-free ion-selective membrane with covalently attached ionophore and ion-exchanger by using a blend of MMA-DMA-AU-1, MMA-DMA-TMCA and blank MMA-DMA polymer. The response slopes and selectivities are shown in Table 3 and FIG. 6A.

upon changing calcium chloride concentrations in the range of $10^{-5}$ to 1 M. The membrane shows a relatively fast response time, which suggests that sufficient mobility of the active components can be maintained in the membranes with covalently attached components. The required mobility for ion-selective electrodes is clearly much smaller than that required for optical sensors, because no appreciable membrane concentration changes occur in the Nemstian response range.[2] The ion mobility in the membrane is kept reasonable high by the low glass transition temperature of the polymer. Therefore, such all-polymeric membranes likely do not contain truly immobilized species, but rather non-leachable components with a limited mobility adequate for ion-selective electrode applications.

Conclusions

Covalent attachment of active sensing components into methacrylic polymers forms a promising route to improve on limits of ion sensors in view of miniaturization and their application in biological samples. The present invention provides a polymerizable carborane ion-exchanger shown to possess characteristics that makes it an attractive replacement for the traditional tetraphenylborate derivatives cur-

TABLE 3

Slopes and selectivities of plasticizer-free MMA-DMA membranes containing either free or grafted calcium ionophore (AU-1) and ion-exchangers

| J | Grafted AU-1 and TMCA slope | $\log K_{Ca,J}^{pot}$ | Grafted AU-1 and free NaTFPB[24] slope | $\log K_{Ca,J}^{pot}$ | Free AU-1 and NaTFPB[24] slope | $\log K_{Ca,J}^{pot}$ |
|---|---|---|---|---|---|---|
| $Mg^{2+}$ | 14.6 ± 2.0 | <−3.21 ± 0.05 | 20.3 ± 2.3 | <−4.6 ± 0.1 | 25.2 ± 2.2 | <−5.8 ± 0.2 |
| $Na^+$ | 30.2 ± 1.8 | <−3.34 ± 0.02 | 36.8 ± 2.5 | <−3.3 ± 0.2 | 45.3 ± 1.5 | <−3.5 ± 0.1 |
| $K^+$ | 33.0 ± 2.1 | <−3.15 ± 0.03 | 38.5 ± 1.1 | <−4.3 ± 0.1 | 49.7 ± 1.4 | <−4.2 ± 0.2 |
| $Ca^{2+}$ | 29.5 ± 0.9 | 0 | 32.1 ± 1.0 | 0 | 31.6 ± 1.8 | 0 |

The plasticizer-free, all-polymeric membrane, with all active components covalently grafted, showed a Nernstian response slope to calcium ions but sub-Nernstian responses to the interfering ions, which was also observed for MMA-DMA-AU-1 membrane with free NaTFPB. As a result, the selectivities of the membrane with both active components grafted appear to be inferior to the membranes with free rently used in the art. Earlier routes to covalent attachment of cation-exchangers have utilized tetraphenylborates, which are difficult to synthesize and likely still suffer from chemical instability.

To demonstrate the utility of the novel carborane derivative of the present invention, leaching experiments and optode response curves were evaluated. The results support the notion that TMCA was covalently attached to the co-polymer, since only the freely dissolved derivative leached out of the thin film optode in a matter of hours. Ion-exchange optode response functions with films containing the grafted carborane followed theoretical predictions perfectly, and exhibited response times that were comparably fast to established systems. This demonstrated that the covalently attached carborane acted as a functional, homogeneously dissolved ion-exchanger with no apparent complications. Ion-selectivities are most drastically influenced by ion pairing processes in the absence of ionophore in the membrane. The corresponding potentiometric experiments did not reveal any unusual selectivity differences for the system of the present invention compared to membranes containing tetraphenylborates.

The novel carborane derivative of this invention was also shown to be useful in improving the selectivity of charged-carrier based membranes, analogous to tetraphenylborates. These results demonstrate the fabrication of an all-polymeric calcium-selective membrane, with no plasticizer and no leachable components. The component of the co-polymer matrices of this invention are likely not truly immobile, but rather are part of a flexible, non-crosslinked polymeric network with a low glass transition temperature. A sufficiently high ion mobility is apparently preserved to ensure reliable potentiometric measurements.

The present invention may be embodied in other specific forms without departing from its essential characteristics. The described embodiment is to be considered in all respects only as illustrative and not as restrictive. The scope of the invention is, therefore, indicated by the appended claims rather than by the foregoing description. All changes, which come within the meaning and range of the equivalence of the claims, are to be embraced within their scope.

The words "comprise," "comprising," "include," "including," and "includes" when used in this specification and in the following claims are intended to specify the presence of stated features, integers, components, or steps, but they do not preclude the presence or addition of one or more other features, integers, components, steps, or groups thereof.

(1) Bühlmann, P.; Pretsch, E.; Bakker, E. *Chem. Rev.* 1998, 98, 1593.
(2) Bakker, E.; Bühlmann, P.; Pretsch, E. *Chem. Rev.* 1997, 97, 3083.
(3) Collison, M. E.; Meyerhoff, M. E. *Anal. Chem.* 1990, 62, A425.
(4) Morf, W. E. *The Principles of Ion-Selective Electrodes and of Membrane Transport*; Elsevier: New York, 1981.
(5) Horrocks, B. R.; Mirkin, M. V.; Pierce, D. T.; Bard, A. J.; Nagy, G.; Toth, K. *Anal. Chem.* 1993, 65, 1213.
(6) Tsagkatakis, I.; Peper, S.; Bakker, E. *Anal. Chem.* 2001, 73, 6083.
(7) Brasuel, M.; Kopelman, R.; Miller, T. J.; Tjalkens, R.; Philbert, M. A. *Anal. Chem.* 2001, 73, 2221.
(8) Gehrig, P.; Rusterholz, B.; Simon, W. *Anal. Chim. Acta* 1990, 233, 295.
(9) Yun, S. Y.; Hong, Y. K.; Oh, B. K.; Cha, G. S.; Nam, H.; Lee, S. B.; Jin, J.-I. *Anal. Chem.* 1997, 69, 868.
(10) Reinhoudt, D. N.; Engbersen, J. F. J.; Brzozka, Z. *Anal. Chem.* 1994, 66, 3618.
(11) Hogg, G.; Lutze, O.; Cammann, K. *Anal. Chim. Acta* 1996, 335, 103.
(12) Poplawski, M. E.; Brown, R. B.; Rho, K. L.; Yun, S. Y.; Lee, H. J.; Cha, G. S.; Paeng, K.-J. *Anal. Chim. Acta* 1997, 355, 249.
(13) Yoon, I. J.; Lee, D. K.; Nam, H.; Cha, G. S.; Strong, T. D.; Brown, R. B. *J. Electroanal. Chem.* 1999, 464, 135.
(14) Bobacka, J.; Ivaska, A.; Lewenstam, A. *Anal. Chim. Acta* 1999, 385, 195.
(15) Peper, S.; Tsagkatakis, I.; Bakker, E. *Anal. Chim. Acta* 2001, 442, 25.
(16) Dimitrakopoulos, T.; Farrell, J. R.; Iles, P. J. *Electroanalysis* 1996, 8, 391.
(17) Kimura, K.; Sunagawa, T.; Yajima, S.; Miyake, S.; Yokoyama, M. *Anal. Chem.* 1998, 70, 4309.
(18) Kimura, K.; Yajima, S.; Takase, H.; Yokoyama, M.; Sakurai, Y. *Anal. Chem.* 2001, 73, 1605.
(19) Heng, L. Y.; Hall, E. A. H. *Anal. Chem.* 2000, 72, 42.
(20) Heng, L. Y.; Hall, E. A. H. *Electroanalysis* 2000, 12, 178.
(21) Malinowska, E.; Gawart, L.; Parzuchowski, P.; Rokicki, G.; Brzozka, Z. *Anal. Chim. Acta* 2000, 421, 93.
(22) Mohr, G. J.; Tirelli, N.; Spichiger-Keller, U. E. *Anal. Chem.* 1999, 71, 1534.
(23) Qin, Y.; Peper, S.; Bakker, E. *Electroanalysis* 2002, 13, 1375.
(24) Qin, Y.; Peper, S.; Radu, A.; Bakker, E. *Anal. Chem.* 2003, 75, 3038.
(25) Peper, S.; Ceresa, A.; Qin, Y.; Bakker, E. *Anal. Chim. Acta* 2003, 500, in press.
(26) Daunert, S.; Bachas, L. G. *Anal. Chem.* 1990, 62, 1428.
(27) Rosatzin, T.; Holy, P.; Seiler, K.; Rusterholz, B.; Simon, W. *Anal. Chem.* 1992, 64, 2029.
(28) Lugtenberg, R. J. W.; Egberink, R. J. M.; Berg, A. v. d.; Engbersen, J. F. J.; Reinhoudt, D. N. *J. Electroanal. Chem.* 1998, 452, 69.
(29) Püntener, M.; Fibbioli, M.; Bakker, E.; Pretsch, E. *Electroanalysis* 2002, 14, 1329.
(30) Meisters, M.; Vandeberg, J. T.; Cassaretto, F. P.; Posvic, H.; Moore, C. E. *Anal. Chim. Acta* 1970, 49, 481.
(31) Nishida, H.; Takada, N.; Yoshimura, M. *Bull. Chem. Soc. Jpn.* 1984, 57, 2600.
(32) Rosatzin, T.; Bakker, E.; Suzuki, K.; Simon, W. *Anal. Chim. Acta* 1993, 280, 197.
(33) Murkovic, I.; Wolfbeis, O. S. *Sens. Actuators B* 1997, 38-39, 246.
(34) Bahr, S. R.; Boudjouk, P. *J. Org. Chem.* 1992, 57, 5545.
(35) Fujiki, K.; Kashiwagi, M.; Miyamoto, H.; Sonoda, A. *J. Fluorine Chem.* 1992, 57, 307.
(36) Peper, S.; Qin, Y.; Almond, P.; McKee, M.; Telting-Diaz, M.; Albrecht-Schmitt, T.; Bakker, E. *Anal. Chem.* 2003, 75, 2131.
(37) Peper, S.; Telting-Diaz, M.; Almond, P.; Albrecht-Schmitt, T.; Bakker, E. *Anal. Chem.* 2002, 74, 1327.
(38) Krondak, M.; Volf, R.; Kral, V. *Collect. Czech. Chem. Commum.* 2001, 66, 1659.
(39) Reed, C. *Acc. Chem. Res.* 1998, 31, 133.
(40) Jelinek, T.; Baldwin, P.; Scheidt, W. R.; Reed, C. A. *Inorg. Chem.* 1993, 32, 1982.
(41) Bakker, E. *Anal. Chem.* 1997, 69, 1061.
(42) Seiler, K.; Simon, W. *Anal. Chim. Acta* 1992, 266, 73.
(43) Tsagkatakis, I.; Peper, S.; Bakker, E. *Anal. Chem.* 2001, 73, 315.
(44) Knoth, W. H. *Inorg. Chem.* 1971, 10, 598.
(45) Bakker, E.; Lerchi, M.; Rosatzin, T.; Rusterholz, B.; Simon, W. *Anal. Chim. Acta* 1993, 278, 211.
(46) Shortreed, M.; Bakker, E.; Kopelman, R. *Anal. Chem.* 1996, 68, 2656.
(47) Bakker, E.; Simon, W. *Anal. Chem.* 1992, 64, 1805.
(48) Bakker, E.; Pretsch, E.; Bühlmann, P. *Anal. Chem.* 2000, 72, 1127.
(49) Schulthess, P.; Ammann, D.; Kräutler, B.; Caderas, C.; Stepánek, R.; Simon, W. *Anal. Chem.* 1985, 57, 1397.

(50) Schaller, U.; Bakker, E.; Spichiger, U. E.; Pretsch, E. *Anal. Chem.* 1994, 66, 391.

What is claimed is:

1. An ion-detecting sensor for detecting a target ion in a sample, comprising
   (i) a self-plasticizing copolymer matrix comprising polymerized units of methacrylate monomers and an ion exchanger comprising a functionalized C-derivative of a closo-dodecacarborane anion, wherein said functionalized ion exchanger is grafted onto the copolymer through covalent linkages; and
   (ii) an ionophore for detecting the target ion,
   wherein said methacrylate monomers comprise a monomer having an $R_1$ pendant alkyl group and a monomer having an $R_2$ pendant alkyl group, wherein $R_1$ is any of $C_{1-3}$ alkyl groups and $R_2$ is any of $C_{4-12}$ alkyl groups, wherein the self-plasticizing copolymer has a glass transitional temperature ($T_g$) of about or below 0° C.

2. The ion-detecting sensor of claim 1, wherein $R_1$ is any of $C_{1-2}$ alkyl groups, and $R_2$ is any of $C_{8-12}$ alkyl groups.

3. The ion-detecting sensor of claim 2, wherein $R_1$ is a $C_1$ alkyl group, and $R_2$ is a $C_{10}$ alkyl group.

4. The ion-detecting sensor of claim 1, wherein said ion exchanger has the structure:

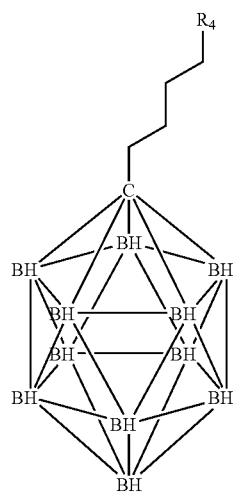

wherein $R_4$ is a substituent comprising a double bond.

5. The ion-detecting sensor of claim 4, wherein $R_4$ is —O(C=O)CH=CH$_2$.

6. The ion-detecting sensor of claim 1, wherein the matrix is in a form of membrane.

7. The ion-detecting sensor of claim 6, wherein the ion-detecting sensor is a carrier-based ion-selective electrode.

8. The ion-detecting sensor of claim 6, wherein the self-plasticizing copolymer matrix and ionophore is in the form of a membrane for a thin film ion-specific optode.

9. The ion-detecting sensor of claim 6, wherein the self-plasticizing copolymer matrix and ionophore is in the form of a membrane for a bulk optode.

10. The ion-detecting sensor of claim 1, wherein the polymer is in a form of particles.

11. The ion-detecting sensor of claim 10, wherein the self-plasticizing copolymer matrix and ionophore is in the form of particles for a particle-based optode.

12. The ion-detecting sensor of claim 1, wherein said ionophore is selective for calcium ions.

13. The ion-detecting sensor of claim 1, further comprising an indicator ionophore.

14. The ion-detecting sensor of claim 13, wherein the indicator ionophore is selected from a group consisting of a pH indicating chromoionophore, a chromoionophore, a fluoroionophore, a pH indicator, and a pH indicating fluoroionophore.

15. The ion detective sensor of claim 1, wherein the target ion selected from a group consisting of $H^+$, $Li^+$, $Na^+$, $K^+$, $Ca^{2+}$, and $Mg^{2+}$.

16. The ion-detecting sensor of claim 1, comprising a sample, wherein the sample is a body fluid selected from the group consisting of whole blood, spinal fluid, blood serum, urine, saliva, semen, and tears.

17. The ion-detecting sensor of claim 1, wherein said copolymer is blended with poly(vinyl chloride) and a plasticizer.

18. The ion-detecting sensor of claim 1, wherein said ionophore is a functionalized ionophore.

19. The ion-detecting sensor of claim 18, wherein at least a portion of the functionalized ionophore is grafted onto the copolymer through covalent linkage.

20. The ion-detecting sensor of claim 18, wherein said functionalized ionophore is a hydrophilic crown ether.

21. The ion-detecting sensor of claim 20, wherein said crown ether is 4'-acryloylamidobenzo-15-crown-5 or 4'-acyloylamidobenzo-18-crown-6.

22. An ion-detecting sensor for detecting a target ion in a sample, comprising
   (i) a self-plasticizing copolymer matrix comprising polymerized units of methacrylate monomers and an ion exchanger comprising a functionalized C-derivative of a closo-dodecacarborane anion, wherein said functionalized ion exchanger is grafted onto the copolymer through covalent linkages; and
   (ii) an ionophore for detecting the target ion,
   wherein said methacrylate monomers have $R_1$ or $R_2$ pendant alkyl groups wherein $R_1$ is any of $C_{1-3}$ alkyl groups and $R_2$ is any of $C_{4-12}$ alkyl groups, wherein at least a portion of the functionalized ionophore is grafted onto the copolymer through covalent linkage, wherein said functionalized ionophore is

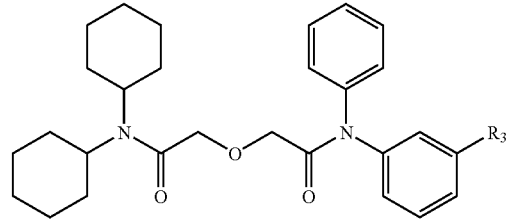

wherein $R_3$ is a substituent comprising an unsaturated group.

23. An ion-detecting sensor of claim 22 wherein $R_3$ is —O(C=O)CH=CH$_2$.

24. A ion-detecting sensor for detecting a target cation in a sample, comprising an ion exchanger covalently grafted into a self-plasticizing co-polymer, and an ionophore for detecting the target ion, wherein said ion exchanger is a derivative of a halogenated carborane anion having a polymerizable moiety, wherein said co-polymer comprises methacrylate monomers, wherein said methacrylate monomers comprise a monomer having an $R_1$ pendant alkyl group and a monomer having an $R_2$ pendant alkyl group, wherein $R_1$ is any of $C_{1-3}$ alkyl groups and $R_2$ is any of $C_{4-12}$ alkyl groups, wherein the self-plasticizing copolymer has a glass transitional temperature ($T_g$) of about or below 0° C.

25. An ion-detecting sensor for detecting a target cation in a sample, comprising a polymerizable ion exchanger covalently grafted into a self-plasticizing co-polymer, and an ionophore for detecting the target ion, wherein said co-polymer comprises methacrylate monomers, wherein said methacrylate monomers comprise a monomer having an $R_1$ pendant alkyl group and a monomer having an $R_2$ pendant alkyl group, wherein $R_1$ is any of $C_{1-3}$ alkyl groups and $R_2$ is any of $C_{4-12}$ alkyl groups, wherein said polymerizable ion exchanger has the structure:

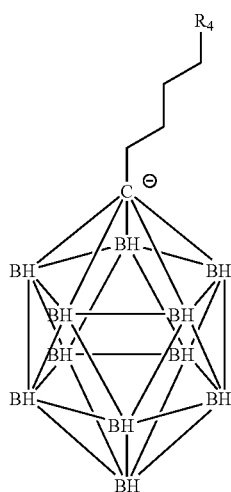

wherein $R_4$ is a substituent comprising a double bond, wherein the self-plasticizing copolymer has a glass transitional temperature ($T_g$) of about or below 0° C.

26. The ion-detecting sensor of claim 25, wherein $R_4$ is —O(C═O)CH═CH$_2$.

27. A method of preparing a plasticizer-free co-polymer responsive to a target ion, comprising:
(a) combining:
   (i) methacrylate monomers, wherein said methacrylate monomers comprise a monomer having an $R_1$ pendant alkyl group and a monomer having an $R_2$ pendant alkyl group, wherein $R_1$ is any of $C_{1-3}$ alkyl groups and $R_2$ is any of $C_{4-12}$ alkyl groups;
   (ii) an ion exchanger comprising a functionalized C-derivative of a closo-dodecacarborane anion having a polymerizable moiety;
   (iii) an ionophore selective for said target ion;
   (iv) a cross-linking monomer; and
   (v) a polymerization initiator; and
(b) treating said combination under conditions that allow said methacrylate monomers and said closo-dodecacarborane anion to copolymerize, wherein the co-polymer has a glass transitional temperature ($T_g$) of about or below 0° C.

28. The method of claim 27, wherein said closo-dodecacarborane anion has the structure

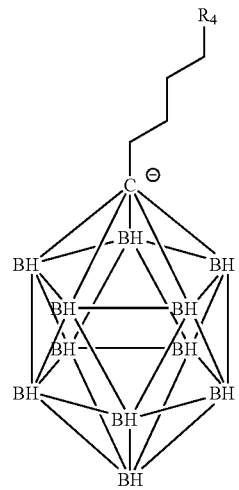

wherein $R_4$ is a substituent comprising a double bond.

29. The method of claim 28, wherein $R_4$ is —O(C═O)CH═CH$_2$.

30. The method of claim 27 further comprising blending said copolymer with poly(vinyl chloride) and a plasticizer.

31. The method of claim 27, wherein $R_1$ is any of $C_{1-2}$ alkyl groups and $R_2$ is any of $C_{8-12}$ alkyl groups.

32. The method of claim 27, wherein said ionophore is a functionalized ionophore.

33. The method of claim 32 wherein said functionalized ionophore has the structure:

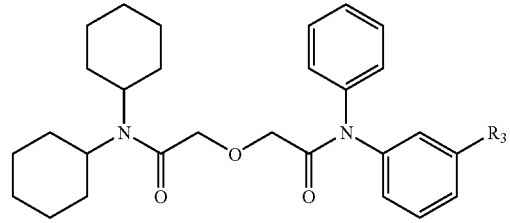

wherein $R_3$ is a substituent comprising an unsaturated group.

34. The method of claim 33, wherein $R_3$ is —O(C═O)CH═CH$_2$.

35. The method of claim 32, wherein said functionalized ionophore is a hydrophilic crown ether.

36. The method of claim 35, wherein said crown ether is 4'-acryloylamidobenzo-15-crown-5 or 4'-acyloylamido-benzo-18-crown-6.

37. The method of claim 32, wherein at least of portion of said ionophore is grafted onto the copolymer.

38. A plasticizer-free co-polymer prepared by the method of claim 27.

39. A sensor comprising a plasticizer-free co-polymer prepared by the method of claim 27, and an ionophore, wherein the ionophore is selective for a target ion.

40. A graft self-plasticizing copolymer having selectivity for a target ion, comprising (i) a copolymer comprising polymerized units of methacrylate monomers; (ii) an ionophore selective for the target ion; and (iii) an ion exchanger comprising a C-derivative of a closo-dodecacarborane anion having a polymerizable moiety, wherein ion exchanger is grafted onto the copolymer through covalent linkages, wherein the graft self-plasticizing copolymer has a glass transitional temperature ($T_g$) of about or below 0° C.

41. The graft copolymer of claim 40, wherein said ion exchanger has the structure:

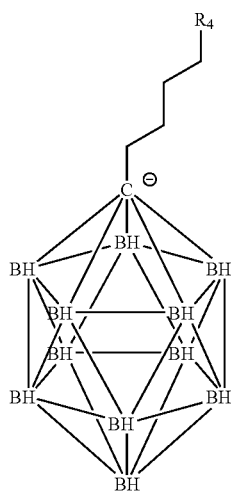

wherein $R_4$ is a substituent comprising a double bond.

42. The graft copolymer of claim 41, wherein $R_4$ is —O(C=O)CH=CH$_2$.

43. The graft copolymer of claim 40, wherein said ionophore is a functionalized ionophore.

44. The graft copolymer of claim 43, wherein said functionalized ionophore is a hydrophilic crown ether.

45. The graft copolymer of claim 43, wherein at least a portion of said ionophore is grafted onto the copolymer.

46. A graft self-plasticizing copolymer having selectivity for a target ion, comprising (i) a copolymer comprising polymerized units of methacrylate monomers; (ii) an ionophore selective for the target ion; and (iii) an ion exchanger comprising a C-derivative of a closo-dodecacarborane anion having a polymerizable moiety, wherein ion exchanger is grafted onto the copolymer through covalent linkages, wherein said ionophore is a functionalized ionophore, wherein said ionophore has the structure:

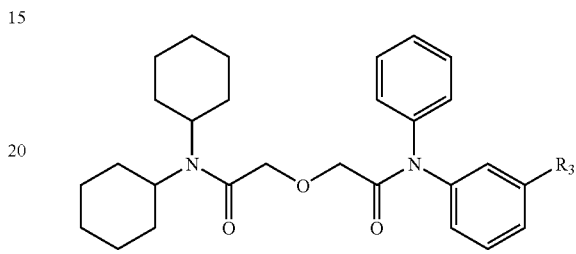

wherein $R_3$ is a substituent comprising an unsaturated group.

47. The graft copolymer of claim 44, wherein said ionophore is 4'-acryloylamidobenzo-15-crown-5.

48. The graft copolymer of claim 44, wherein said ionophore is 4'-acryloylamidobenzo-18-crown-6.

* * * * *